US010186964B1

(12) United States Patent
Hanschke et al.

(10) Patent No.: US 10,186,964 B1
(45) Date of Patent: Jan. 22, 2019

(54) HYSTERETIC POWER CONVERTER CONTROLLER

(71) Applicant: TEXAS INSTRUMENTS INCORPORATED, Dallas, TX (US)

(72) Inventors: Michael Ryan Hanschke, Dallas, TX (US); Salvatore Giombanco, Cassaro (IT); John C. Vogt, Denton, TX (US); Filippo Marino, Tremestieri Etneo (IT); Joseph Michael Leisten, Cork (IE); Ananthakrishnan Viswanathan, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/943,415

(22) Filed: Apr. 2, 2018

Related U.S. Application Data

(60) Provisional application No. 62/596,579, filed on Dec. 8, 2017.

(51) Int. Cl.
  *H02M 3/157* (2006.01)
  *H02M 3/156* (2006.01)
(52) U.S. Cl.
  CPC ............ *H02M 3/157* (2013.01); *H02M 3/156* (2013.01)

(58) Field of Classification Search
  CPC ...... H02M 3/155; H02M 3/156; H02M 3/157; H02M 3/158; H02M 2003/155; H02M 2003/156; H02M 2003/158
  See application file for complete search history.

(56) References Cited

U.S. PATENT DOCUMENTS

| 8,487,600 | B2 * | 7/2013 | Prodic | H02M 3/157 323/283 |
| 8,773,102 | B2 * | 7/2014 | Menegoli | H02M 3/07 323/222 |
| 9,124,177 | B2 * | 9/2015 | Zhu | H02M 3/1588 |
| 2013/0015829 | A1 * | 1/2013 | Menegoli | H02M 3/158 323/282 |
| 2014/0320094 | A1 * | 10/2014 | Huang | H02M 3/156 323/235 |
| 2016/0105110 | A1 * | 4/2016 | Houston | H02M 3/1582 323/271 |

* cited by examiner

*Primary Examiner* — Matthew Nguyen
(74) *Attorney, Agent, or Firm* — Tuenlap D. Chan; Charles A. Brill; Frank D. Cimino

(57) ABSTRACT

At least some aspects of the present disclosure provide for a circuit. In one example, the circuit includes a logic circuit having multiple inputs and multiple outputs, a calculated discontinuous conduction (DCM) (TDCM) timer having an input coupled to one of the logic circuit outputs and an output coupled to one of the logic circuit inputs, an on-time (TON) timer having an input coupled to one of the logic circuit outputs and an output coupled to one of the logic circuit inputs, and a hysteresis timer having an input coupled to one of the logic circuit outputs and multiple outputs coupled to multiple of the logic circuit inputs.

20 Claims, 14 Drawing Sheets

HYSTERETIC POWER CONVERTER CONTROLLER

CROSS-REFERENCE TO RELATED APPLICATIONS

The present application claims priority to U.S. Provisional Patent Application No. 62/596,579 filed Dec. 8, 2017 by Michael Hanschke, et al. and entitled "POWER CONVERTER CONTROLLER," which is incorporated herein by reference as if reproduced in its entirety.

BACKGROUND

Power converter controllers may control a power converter to operate in either a critical conduction (CRM) mode of operation or a discontinuous conduction (DCM) mode of operation to increase operational efficiency of the power converter. During some transitions during a single line cycle from the CRM operation mode to the DCM operation mode, or from the DCM operation mode to the CRM operation mode, distortion in current output by the power converter may occur. To at least partially mitigate and/or compensate for the distortion, the power converter controller may lock the power converter in either the CRM operation mode or the DCM operation mode based on a calculated DCM time (TDCM) to prevent a CRM operation mode to DCM operation mode (or DCM operation mode to CRM operation mode) transition during the line cycle.

SUMMARY

At least some aspects of the present disclosure provide for a circuit. In one example, the circuit comprises a logic circuit having multiple inputs and multiple outputs, a calculated discontinuous conduction (DCM) time (TDCM) timer having an input coupled to one of the logic circuit outputs and an output coupled to one of the logic circuit inputs, an on-time (TON) timer having an input coupled to one of the logic circuit outputs and an output coupled to one of the logic circuit inputs, and a hysteresis timer having an input coupled to one of the logic circuit outputs and multiple outputs coupled to multiple of the logic circuit inputs.

At least some other aspects of the present disclosure provide for a system. In one example, the system comprises a power converter comprising at least one power transistor and a power converter controller. The power converter controller comprises a logic circuit having first, second, third, fourth, and fifth logic circuit inputs and first, second, and third logic circuit outputs. The power converter controller further comprises a TDCM timer having a first TDCM timer input and a second TDCM timer input, the second TDCM timer input coupled to the first logic circuit output, and a TDCM timer output coupled to the first logic circuit input. The power converter controller further comprises a TON timer having a first TON timer input and a second TON timer input, the first TON timer input coupled to the second logic circuit output, and a TON timer output coupled to the second logic circuit input. The power converter controller further comprises a double differentiator having a double differentiator input and a double differentiator output. The power converter controller further comprises a delay element having a delay element input coupled to the double differentiator output and a delay element output coupled to the third logic circuit input. The power converter controller further comprises a clock generator having a clock generator input coupled to the first output of the logic circuit and a clock generator output. The power converter controller further comprises a hysteresis timer having a first hysteresis timer input coupled to the clock generator output, a second hysteresis timer input coupled to the second output of the logic circuit, a first hysteresis timer output coupled to the fourth logic circuit input, and a second hysteresis timer output coupled to the fifth logic circuit input.

At least some other aspects of the present disclosure provide for a method. In one example, the method comprises controlling a power converter to operate in a TON phase of a DCM operation mode, controlling the power converter to continue operating in the DCM operation mode when a calculated TDCM timer of a preceding switching cycle of the power converter is greater than a first threshold, beginning a first new TDCM timer when operating in the DCM operation mode, determining whether at least a second zero crossing detection (ZCD) of a drain voltage ($V_{DRAIN}$) of the power converter has occurred in the DCM operation mode, and returning to controlling the power converter to operate in the TON phase of the DCM operation mode when at least the second ZCD has occurred in the DCM operation mode. The method further comprises controlling the power converter to begin operating in a CRM operation mode when the first new TDCM timer of the preceding switching cycle of the power converter is less than the first threshold, beginning a second new TDCM timer when operating in the CRM operation mode, and determining whether a first ZCD of the power converter has occurred in the CRM operation mode. The method further comprises controlling the power converter to operate in the TON phase of the CRM operation mode when the first ZCD has occurred in the CRM operation mode, controlling the power converter to continue operating in the CRM operation mode a length of time of the TON phase of the CRM operation mode and a TDCH phase is greater than a second threshold and a TDCM timer of another preceding switching cycle of the power converter is less than the second threshold, and controlling the power converter to return to operating in the DCM operation mode when the second new TDCM timer is greater than the second threshold.

BRIEF DESCRIPTION OF THE DRAWINGS

For a detailed description of various examples, reference will now be made to the accompanying drawings in which.

DETAILED DESCRIPTION

Figure 1:
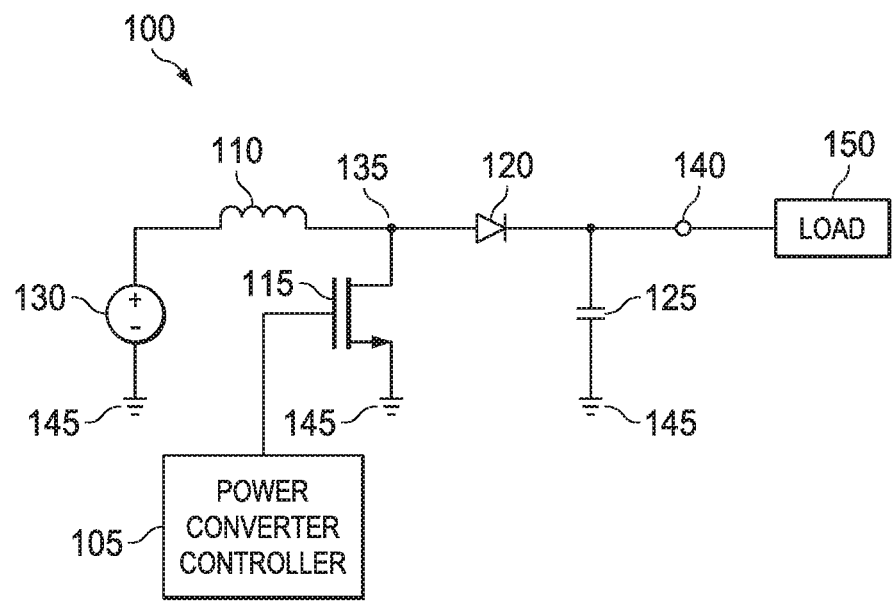
FIG. 1 is a schematic diagram of an illustrative power converter in accordance with various examples.

To lock a power converter in the critical conduction (CRM) operation mode or the discontinuous conduction (DCM) operation mode, at least some power converter controllers implement a hysteresis method for controlling the power converter. The hysteresis method is implementable through digital circuitry or through analog circuitry; however, challenges may arise in each form of implementation. In a hysteresis method, such as provided for by at least some aspects of the present disclosure, a duration of time in a periodic waveform that a power transistor (e.g., a metal oxide semiconductor field effect transistor (MOSFET), sometimes referred to as a power switch) of the power converter operating under the control of the power converter controller is not conducting, after a period of time that the power transistor has been conducting (referred to as TON or a TON phase), but before an inductor current waveform of an inductor of the power converter reaches a first valley crossing of the waveform or the beginning of a next TON phase is referred to as a TDCH phase. A duration of time in a periodic waveform between the end of the TDCH phase and the beginning of the next TON phase is referred to as a calculated DCM time (TDCM) phase.

In at least one example of a digital implementation of the hysteresis method, a digital counter counts the TDCM time and the count is compared against one or more threshold values. For a maximum TDCM time that is large (e.g., orders of magnitude greater than the threshold values), the digital counters may be large in size to provide desired performance (e.g., such as ability to count to the maximum TDCM time), which may increase a cost of the digital counters, an area occupied by the digital counters, and/or a power consumption of the digital counters. In at least one example of an analog implementation of the hysterias method, an input voltage is sensed and compared against one or more threshold values. For threshold values that are small (e.g., orders of magnitude less than the maximum TDCM time), the threshold values may be on a same or similar order of magnitude as noise (e.g., device noise or parasitic coupling noise) existing in the system. As such, in the analog implementations, the noise may interfere with accurate comparison to the threshold values and may inhibit consistent implementation of a design from device to device.

To at least partially mitigate for the above shortcomings of the digital and the analog implementations, aspects of the present disclosure include examples of a mixed signal implementation for performing hysteresis in control of a power converter. The hysteresis, in at least some examples, provides for power factor correction in the power converter. In at least some examples, the mixed signal implementation includes both digital aspects and analog aspects. For example, the mixed signal implementation may generate a TDCM time at least partially using analog circuitry and measure TDCM thresholds at least partially using a digital counter (e.g., implemented as a timer). At least some aspects of the mixed signal implementation may provide for a power factor correction having a degree of accuracy comparable to digital implementations while having a cost comparable to analog implementations. For example, to at least partially mitigate the increased cost associated with a size of the digital counter generating the TDCM time in a digital implementation, at least some examples of the mixed signal implementation generate the TDCM time using an analog timer circuit. As another example, to at least partially mitigate the difficulty in accurately performing measurements and/or comparisons in an analog implementation, at least some of the examples of the mixed signal implementation measure TDCM thresholds using a small size (e.g., low-resolution) digital counter implemented as a timer.

As discussed above, aspects of the mixed signal implementation of a power converter controller of the present disclosure can include an analog timer that may be suitable for generating an analog TDCM time. Aspects of the mixed signal implementation of the present disclosure can also include at least one digital circuit (e.g., including at least some digital logic structures, components, elements, and/or devices) suitable for measuring at least one TDCM threshold (e.g., a $TDCM_{LOW}$ threshold and/or a $TDCM_{HIGH}$ threshold) and/or determining an operating mode (CRM or DCM) of, or for, a power converter. In at least one example, the TDCM time generated by the analog timer may be measured by the digital circuit in real-time (or substantially real-time), which may be contrasted with approaches that calculate or predict the TDCM time in advance of the measurement. Measuring the TDCM time in real-time may insert a delay of about one switching cycle into the power converter controller. For example, the power converter controller may make a determination of CRM or DCM operation mode for a switching cycle X based, at least partially, on a TDCM time measured in real-time (or substantially real-time) during a switching cycle X-1. In at least one example, while operating in the CRM operation mode the analog timer generating the TDCM operates in parallel with TON and TDCH phases of a power converter coupled to the power converter controller, for example, until the analog timer expires or reaches the $TDCM_{HIGH}$ threshold. In at least one example, during DCM operation the power converter controller may ignore a first valley of a voltage and/or current the waveform of the power converter coupled to the power converter controller (such as a voltage waveform corresponding to a power transistor of the power converter), for example, to improve consistency of operation of the power converter controller.

Referring now to FIG. 1, a schematic diagram of an illustrative power converter 100 is shown. While illustrated in the example of FIG. 1 as a boost power converter, other examples of the power converter 100 may be implemented as a buck converter, a buck-boost converter, a hybrid converter, or any other power converter topology or architecture in which components shown in the power converter 100 may be omitted, rearranged, and/or additional components not presently shown may be added to the power converter 100. In at least one example, the power converter 100 is coupled to, or configured to couple to, a power converter controller 105.

In one example, the power converter 100 includes an inductor 110, a transistor 115, a diode 120, and a capacitor 125. In another example, the power converter 100 includes (e.g., within a single component package and/or on a single semiconductor die) the transistor 115 and is configured to couple to the inductor 110, the diode 120, and the capacitor 125. In yet another example, the power converter 100 includes the transistor 115 and the diode 120 and is configured to couple to the inductor 110 and the capacitor 125. In at least one example, the power converter 100 is configured to couple to a power source 130 to receive a voltage upon which an output of the power converter 100 (e.g., as present at a node 140) is at least partially based. For example, the inductor 110 is configured to couple at a first terminal to the power source 130 and at a second terminal to a node 135. In this example, the transistor 115 is configured to couple at a drain terminal to the node 135, at a source terminal to a ground node 145 (e.g., which is held at or near a ground voltage potential), and at a gate terminal to the power converter controller 105. Continuing with the example, the diode 120 is configured to couple between the node 135 and the node 140 and the capacitor 125 is configured to couple between the node 140 and the ground node 145. In at least one example, the power converter 100 is configured to couple at the node 140 to a load 150. In some examples, the power converter 100 is further configured to couple at the node 140 to the power converter controller 105 (e.g., to provide feedback) and/or couple at other connections, nodes, or couplings of the power converter 100 to the power converter controller 105. In at least one example, the power converter 100 further includes additional components (not shown) suitable for measuring a current flowing through the power converter 100 or any individual component of the power converter 100. For example, the power converter 100 may further include a current sense resistor and/or any other current or voltage sensing or measuring components for providing feedback to the power converter controller 105 or any other device.

As illustrated in FIG. 1, the transistor 115 is a n-type MOSFET (NMOS). However, in other examples the transistor 115 may be implemented as a p-type MOSFET (PMOS), a bi-polar junction transistor (BJT), or using any other suitable form of semiconductor process or technology. In at least some examples utilizing a transistor 115 implemented as anything other than a NMOS, further presently unshown alterations (e.g., addition, removal, and/or reconfiguration of components) to the power converter 100 might be made.

Operation of the power converter 100 is at least partially controlled by the power converter controller 105, for example, by the power converter controller 105 controlling the transistor 115 via the coupling to the gate terminal of the transistor 115. For example, the power converter controller 105 controls the power converter 100 by manipulating a value (e.g., a voltage level and/or a current level) of a signal provided to the gate terminal of the transistor 115. Manipulating the value of the signal provided to the gate terminal of the transistor 115 controls current flow between the drain terminal and the source terminal of the transistor 115. For example, when a signal having a sufficiently large value (e.g., a voltage that exceeds a gate to source voltage ($V_{gs}$) of the transistor 115, sometimes referred to as a high signal value) is provided to the transistor 115, the transistor 115 begins conducting between its drain and source terminals (sometimes referred to as the transistor 115 being turned on and indicated as $T_{ON}$). In at least some examples, when the value of the signal further increases with respect to $V_{gs}$, an amount of conduction between the drain and source terminals of the transistor 115 (e.g., an amount of current flowing) is varied. When the signal provided to the gate terminal of the transistor 115 does not have a sufficiently large value (sometimes referred to as a low signal value), the transistor 115 stops conducting between its drain and source terminals (sometimes referred to as the transistor 115 being turned off).

In at least one example, when the power converter controller 105 turns on the transistor 115, current flows into the inductor 110 from the power source 130 by virtue of the path for current flow formed by the transistor 115 from the node 135 to the ground node 145. During this stage of operation, the inductor 110 stores electrical energy and the capacitor 125, if any energy is stored in the capacitor 125, discharges its stored energy to the load 150. When the power converter controller 105 turns off the transistor 115, the energy stored in the inductor 110 flows out of the inductor 110, through the diode 120, and into the capacitor 125 (charging the capacitor 125) and load 150. In at least some examples, by controlling the transistor 115 to turn on again before the inductor 110 has fully discharged, the power converter controller 105 controls the power converter 100 to provide a signal to the load 150 having a voltage greater than a voltage received by the power converter 100 from the power source 130.

In some examples, a current flowing through the inductor 110 (either into the inductor 110 during charging or out of the inductor 110 during discharging) is indicated as $I_L$, $V_{DRAIN}$ is the voltage present at the drain terminal of the transistor 115 (e.g., as present at node 135), $V_{GATE}$ is the voltage present at the gate terminal of the transistor 115 (e.g., as provided by the power converter controller 105), and $V_{OUT}$ is an output voltage of the power converter 100 (e.g., as present at node 140).

Figure 2:
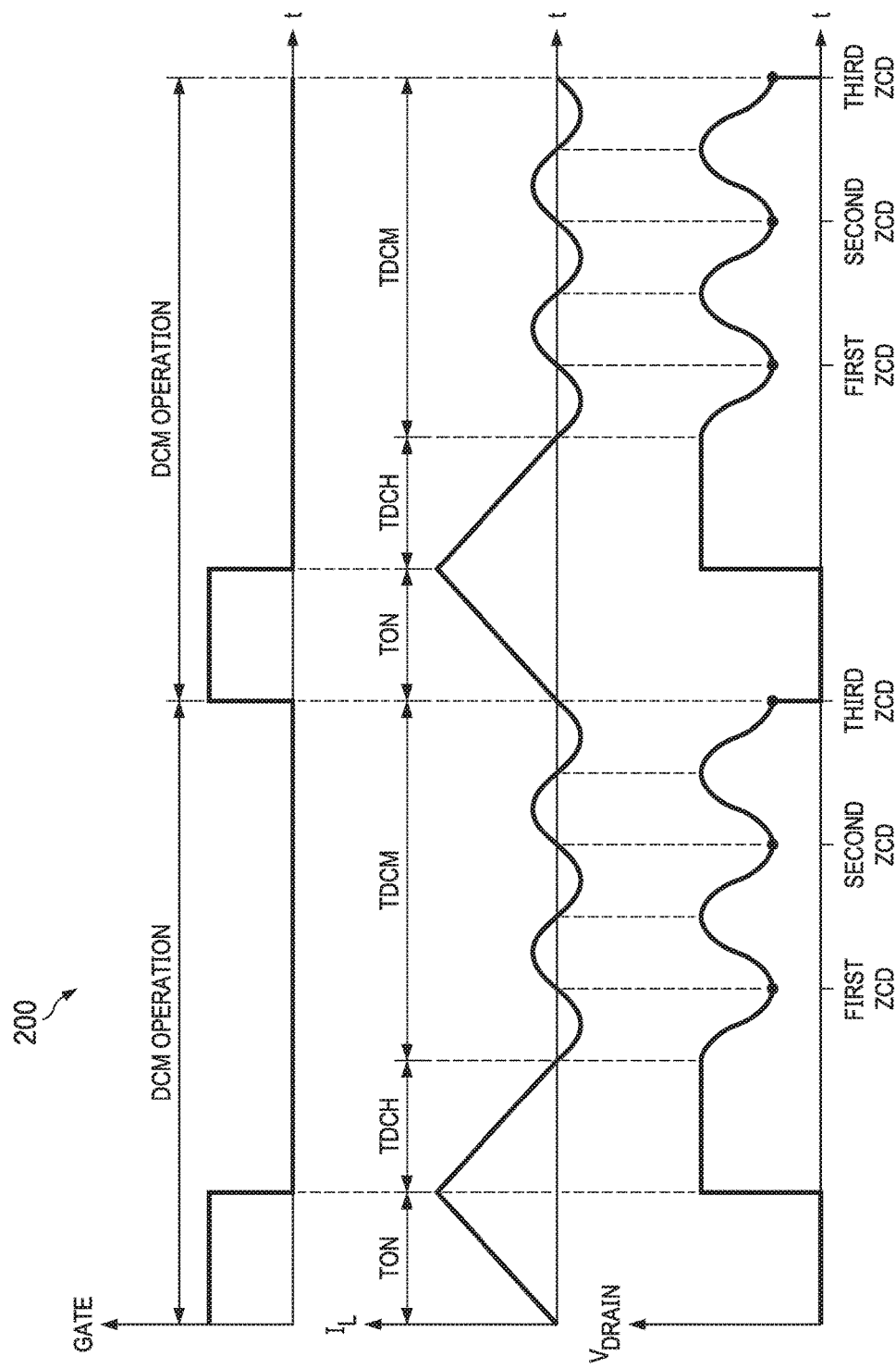
FIG. 2 is a diagram of various signal waveforms of a power converter in accordance with various examples.

FIG. 2 illustrates a diagram 200 of various signal waveforms of the power converter 100 under control of the power converter controller 105. In at least one example, the diagram 200 includes waveforms corresponding to $V_{GATE}$, $I_L$, and $V_{DRAIN}$ on vertical axes and time on horizontal axes. As illustrated in FIG. 2, when $V_{GATE}$ has a logical high signal value during DCM operation, the power converter 100 operates in the TON phase and the inductor 110 begins to charge, increasing $I_L$. At the end of the TON phase, the power converter controller 105 provides $V_{GATE}$ having a low signal value to the gate terminal of the transistor 115 to cause the power converter 100 to operate in the TDCH phase. During the TDCH phase the inductor 110 begins to discharge, decreasing $I_L$. In some examples, a switched mode power supply (SMPS) including the power converter 100 includes parasitic characteristics that affect the value of $I_L$ during discharge of the inductor 110 and/or $V_{DRAIN}$ of the transistor 115. At least one example of such parasitic characteristics is a parasitic capacitance present at the drain terminal of the transistor 115, though numerous other parasitic characteristics may also exist in, or affect, the power converter 100 and waveforms of various signals within, or associated with, the power converter 100.

As $I_L$, and correspondingly $V_{DRAIN}$, decreases, the parasitic characteristics can cause ringing in $I_L$ and/or $V_{DRAIN}$. The ringing occurs, for example, at a resonant frequency of the SMPS created by the parasitic characteristics. The ringing is, in some examples, oscillation of $I_L$ and/or $V_{DRAIN}$ about a value, for example, oscillating between positive and negative values approximately equidistant from zero. Each minimum in the oscillation of $I_L$ and/or $V_{DRAIN}$ is referred to as a valley. In some examples, only one valley occurs when operating the TDCH phase. In another example, any non-negative number of valleys may occur when operating in the TDCM phase. A number of valleys during the TDCM phase, in some examples, is determined according to the resonant frequency of the SMPS created by the parasitic characteristics and the duration of the TDCM phase. In at least one example, a minimum value of each valley of $V_{DRAIN}$ is referred to as a zero crossing detection (ZCD).

Figure 3:
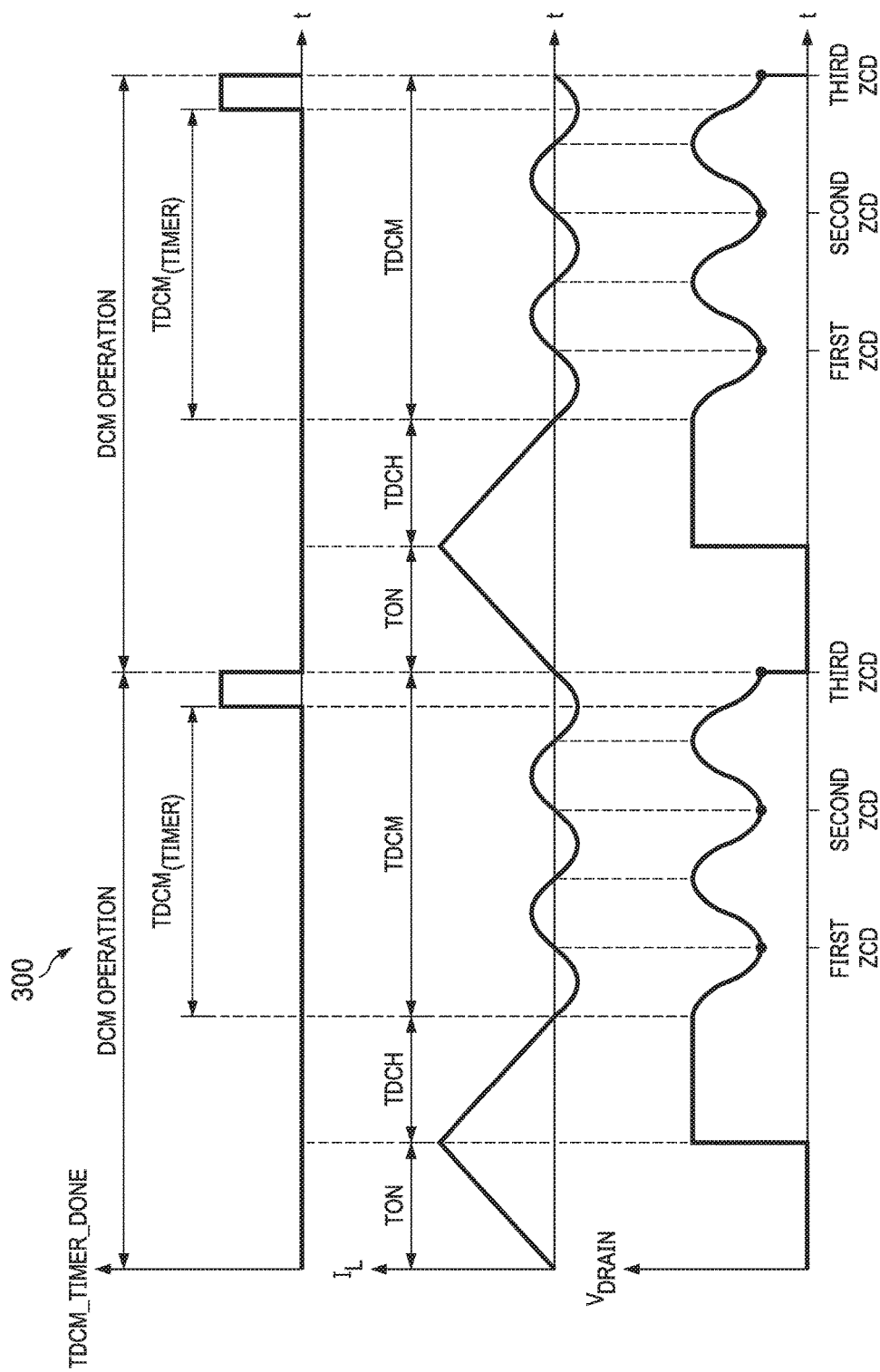
FIG. 3 is a diagram of various signal waveforms of a power converter in accordance with various examples.

FIG. 3 illustrates a diagram 300 of various signal waveforms of the power converter 100 under control of the power converter controller 105. In at least one example, the diagram 300 may be substantially similar to the diagram 200 of FIG. 2, with the VGATE signal of diagram 200 being replaced by a TDCM_TIMER_DONE signal on a vertical axis.

The TDCM_TIMER_DONE signal, in at least some examples, transitions to a high state when a TDCM Timer (TDCM$_{(TIMER)}$) duration expires. In at least one example, TDCM$_{(TIMER)}$ is an expression calculated depending at least partially on the power requested from the power converter, VIN, and/or power loss characteristics of the SMPS. In at least one example, TDCM$_{(TIMER)}$ is an approximation for a given power stage. TDCM$_{(TIMER)}$ is calculated, in at least some examples, according to the below equation 1:

$$TDCM_{(TIMER)} = TON_{MAX} * \left( A1 * \frac{POUT_{(MAX)}}{POUT} * \frac{VIN}{VIN_{(MIN)}} - A2 \right), \quad (1)$$

where TON$_{MAX}$ is a maximum TON time, A1 is a gain fitting coefficient, A2 is a constant fitting coefficient, VIN is a peak line voltage, and VIN$_{(MIN)}$ is a minimum line voltage.

In at least some examples, the TDCM$_{(TIMER)}$ duration represents the minimum TDCM time during DCM operation. The TDCM$_{(TIMER)}$ begins, in some examples, when the TDCH phase ends. The TDCM$_{(TIMER)}$ expires, in at least some examples, when the TDCM_TIMER_DONE signal transitions to a high state. In some examples, the TDCM_TIMER_DONE signal is a momentary (e.g., pulse) signal that latches to the high state until the beginning of a subsequent TON phase during DCM operation at which time the TDCM_TIMER_DONE signal may be reset. In at least one example (such as illustrated in FIG. 3), the TDCM$_{(TIMER)}$ expires prior to the SMPS beginning the TON phase. In other examples, a transition to the TON phase may be delayed until the TDCM$_{(TIMER)}$ has expired and the V$_{DRAIN}$ is at a valley (e.g., at a ZCD).

FIGS. 4 through 8 illustrate further diagrams of various waveforms of the power converter 100 under control of the power converter controller 105. In at least one example, the diagram 400, diagram 500, diagram 600, diagram 700, and diagram 800 include waveforms corresponding to V$_{DRAIN}$ and TDCM_TIMER_DONE on vertical axes and time on horizontal axes.

Figure 4:
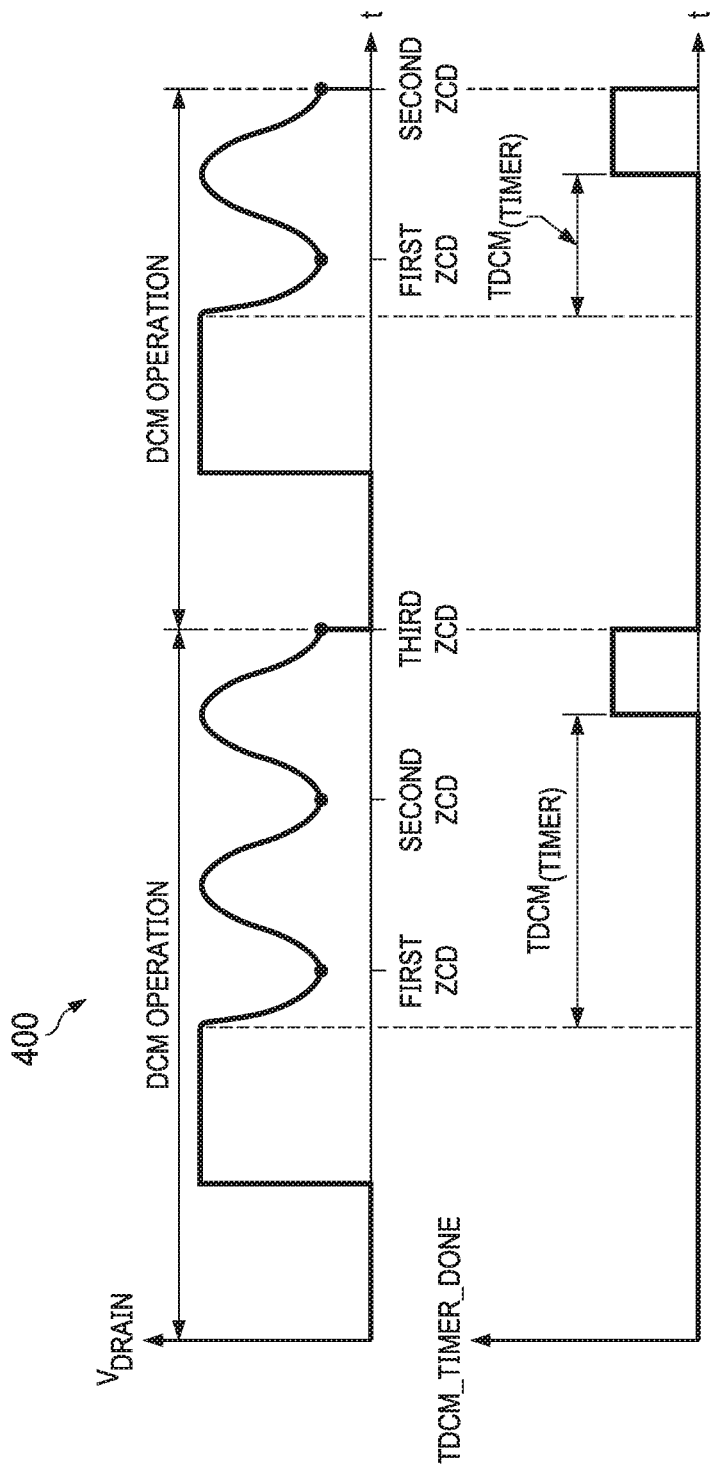
FIG. 4 is a diagram of various signal waveforms of a power converter in accordance with various examples.
Figure 5:
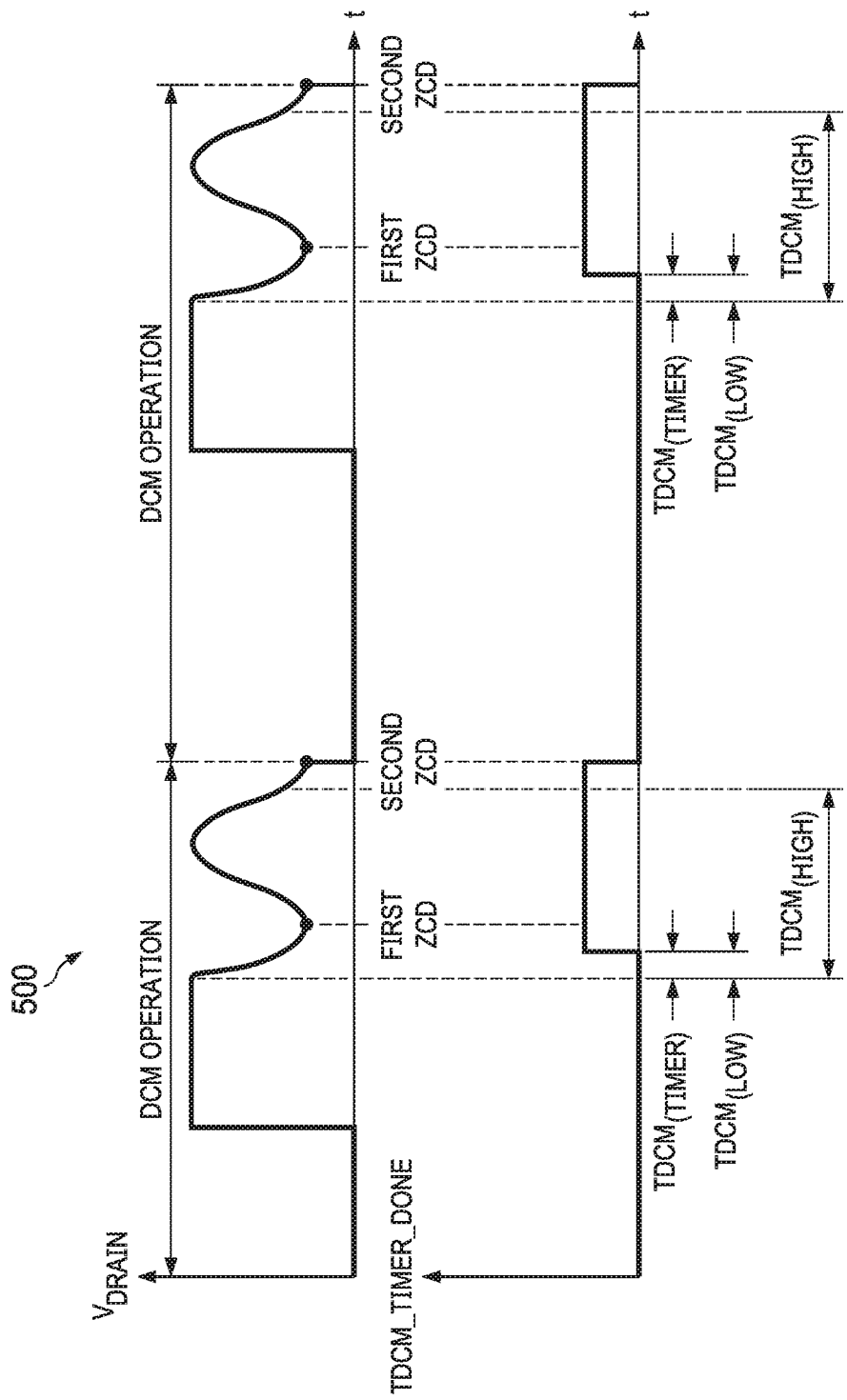
FIG. 5 is a diagram of various signal waveforms of a power converter in accordance with various examples.

As illustrated in FIG. 4, in some examples, the TDCM$_{(TIMER)}$ expires prior to a second ZCD of V$_{DRAIN}$ during DCM operation. In such examples, the TDCM phase may continue until at least a second ZCD of V$_{DRAIN}$ and the power converter 100 may be controlled to transition from the TDCM phase to the TON phase at the second ZCD of V$_{DRAIN}$. In some examples, the TDCM phase continues until at least the second ZCD because variations in I$_L$ can sometimes occur while transitioning from the first ZCD to the second ZCD. These variations in I$_L$ sometimes create distortion in the power converter 100 (e.g., present in an output signal of the power converter 100), negatively impacting operation of the power converter 100. As illustrated in FIG. 5, in some examples, one or more thresholds exist for comparison to the TDCM$_{(TIMER)}$. For example, the TDCM$_{(TIMER)}$ may be compared to at least a TDCM$_{(LOW)}$ threshold and/or a TDCM$_{(HIGH)}$ threshold. In some examples, the TDCM$_{(LOW)}$ threshold and the TDCM$_{(HIGH)}$ threshold are hysteretic thresholds on which control of the power converter 100 is at least partially based, for example, to mitigate rapid toggling of operation modes of the power converter 100 (such as between DCM and CRM operation). In at least some examples, the power converter controller 105 controls a subsequent switching cycle of the power converter 100 based on timing of a preceding switching cycle, as illustrated in the present figures.

In at least one example, when the TDCM$_{(TIMER)}$ expires prior to the second ZCD of V$_{DRAIN}$, but after the TDCM$_{(LOW)}$ threshold, the power converter 100 is controlled to transition from the TDCM phase to the TON phase while remaining in DCM operation mode for a subsequent switching cycle (e.g., such that the TON phase begins some finite time after the first ZCD of V$_{DRAIN}$). In at least some examples, the TDCM$_{(HIGH)}$ threshold is not utilized (e.g., may be ignored) when the power converter 100 is operating in the DCM operation mode.

Figure 6:
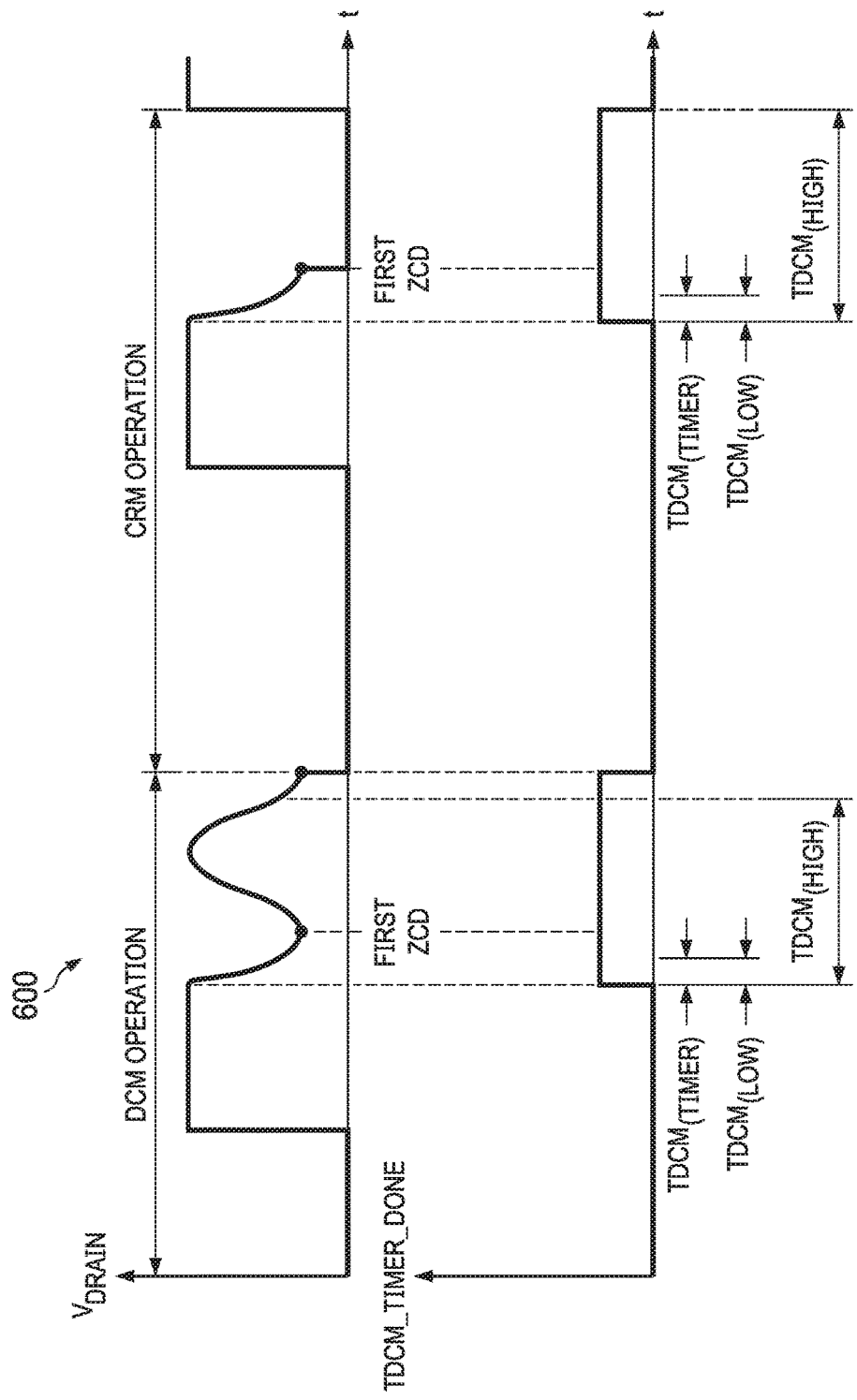
FIG. 6 is diagram of various signal waveforms of a power converter in accordance with various examples.

As illustrated in FIG. 6, in some examples, the TDCM$_{(TIMER)}$ expires prior to the second ZCD of V$_{DRAIN}$ and before the TDCM$_{(LOW)}$ threshold, the power converter 100 is controlled to transition to CRM operation mode for a subsequent switching cycle. For example, at the second ZCD of V$_{DRAIN}$, the power converter 100 may be controlled to transition from TDCM in the DCM operation mode to TON in the CRM operation mode for a subsequent switching cycle (e.g., such that TDCH is set to a duration to cause the TON phase to begin at the first ZCD of V$_{DRAIN}$). In at least one example, during the CRM operation mode the TDCM$_{(TIMER)}$ may continue running until the TDCM$_{(HIGH)}$ threshold has elapsed.

Figure 7:
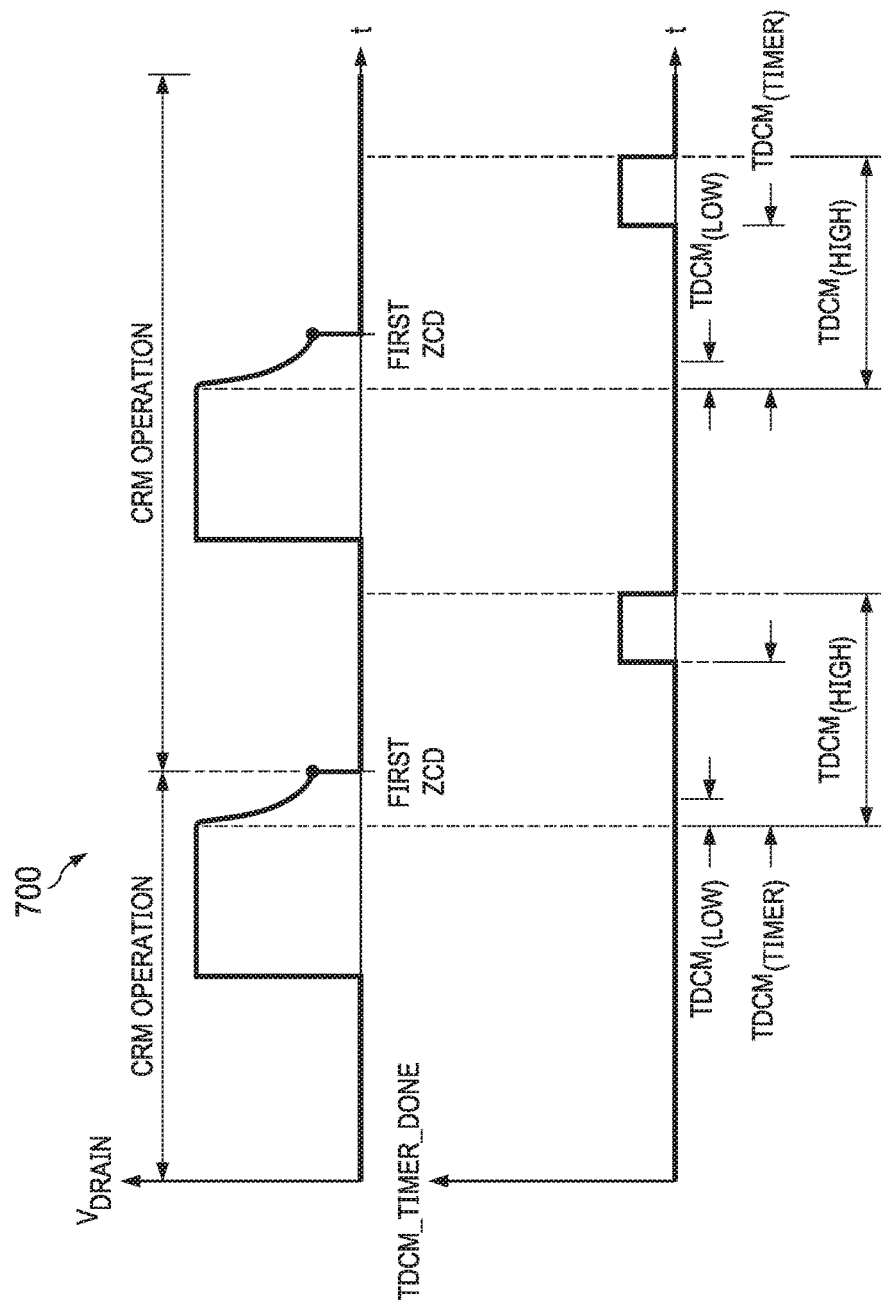
FIG. 7 is a diagram of various signal waveforms of a power converter in accordance with various examples.

As illustrated in FIG. 7, in some examples, the TDCM$_{(TIMER)}$ may expire prior to the TDCM$_{(HIGH)}$ threshold. In such examples, the power converter 100 is controlled to transition from the TDCM phase to the TON phase while remaining in CRM operation mode for a subsequent switching cycle (e.g., such that the TON phase continues to begin at the first ZCD of V$_{DRAIN}$). In at least some examples, the TDCM$_{(LOW)}$ threshold is not utilized (e.g., may be ignored) when the power converter 100 is operating in the CRM operation mode.

Figure 8:
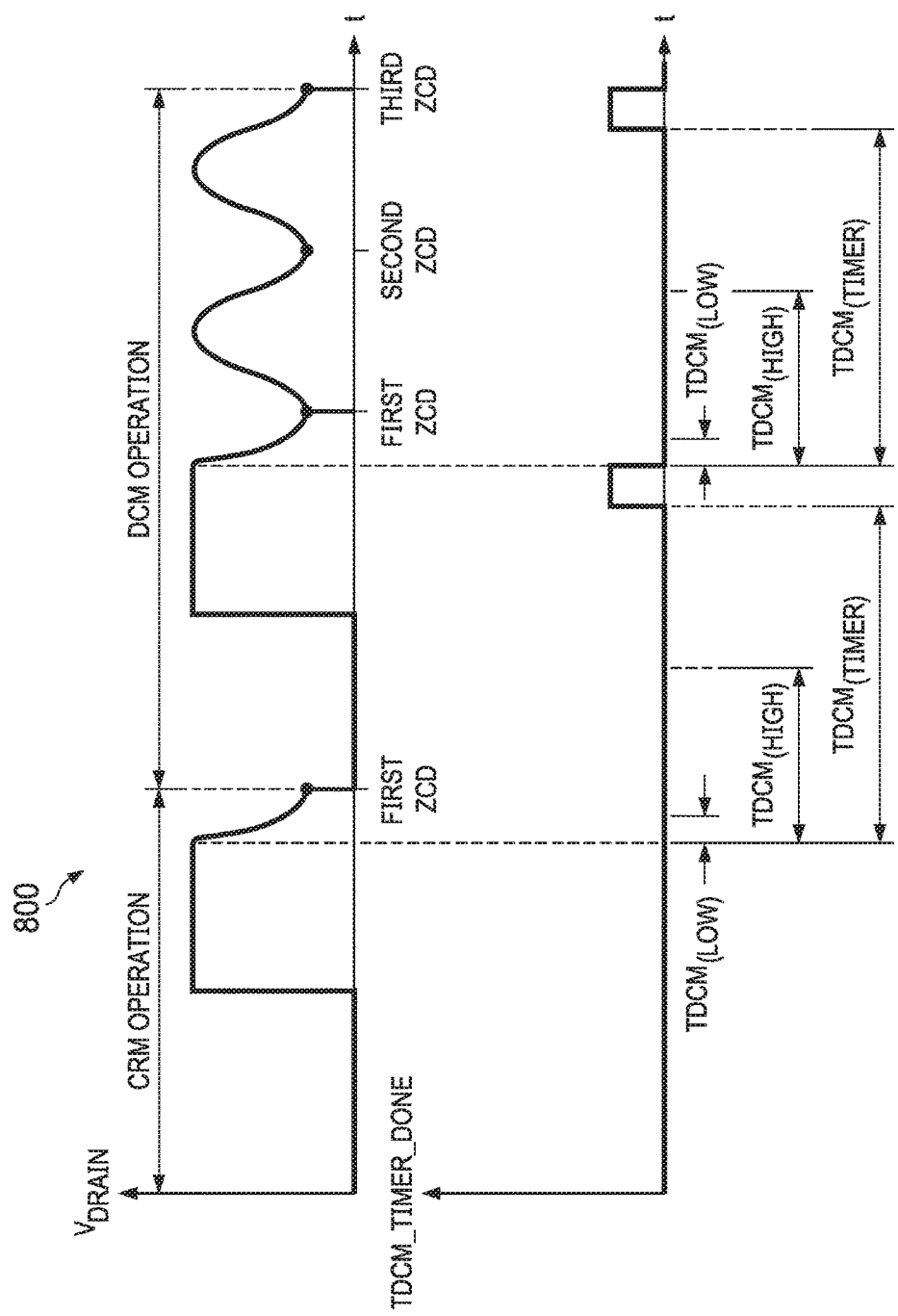
FIG. 8 is a diagram of various signal waveforms of a power converter in accordance with various examples.

As illustrated in FIG. 8, in some examples, the TDCM$_{(TIMER)}$ may not expire prior to the TDCM$_{(HIGH)}$ threshold. In such examples, the power converter 100 is controlled to transition to DCM operation mode for a subsequent switching cycle. For example, at the first ZCD of V$_{DRAIN}$, the power converter 100 may be controlled to transition from TDCM in the CRM operation mode to TON in the DCM operation mode for a subsequent switching cycle.

Figure 9:
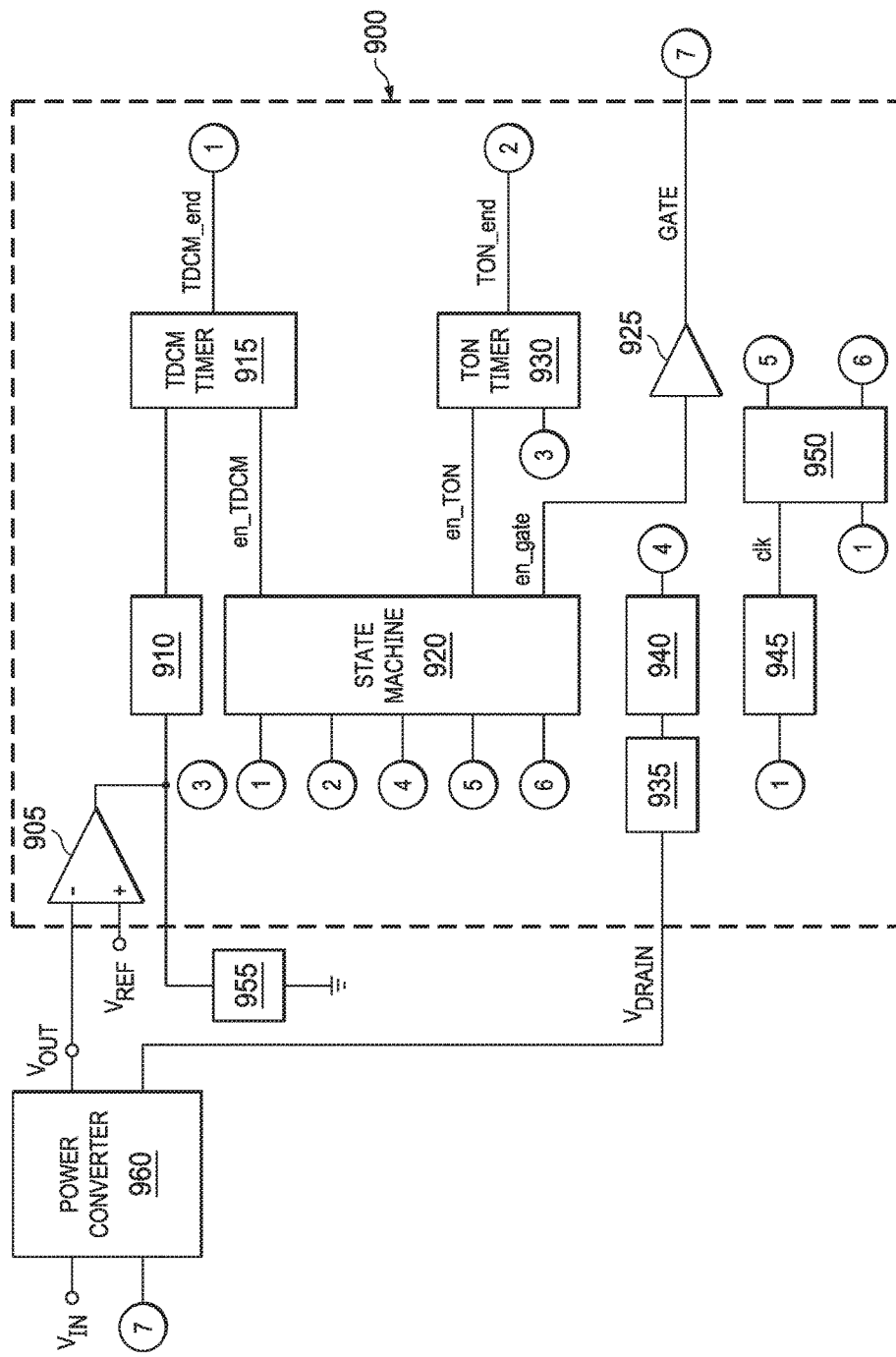
FIG. 9 is a schematic diagram of an illustrative circuit in accordance with various examples.

Referring now to FIG. 9, a schematic diagram of an illustrative circuit 900 is shown. The circuit 900 is, in some examples, suitable to implement at least some aspects of the present disclosure, for example, to control a power converter. In at least one example, the circuit 900 is suitable for implementation as the power converter controller 105 of FIG. 1, discussed above, such that the circuit 900 at least partially controls a power converter such as the power converter 100. In various examples, the circuit 900 controls a power converter to operate (and/or switch between) DCM and CRM operation modes according to one or more input signals received by the controller and/or determined by the controller, such as described above with respect to, and illustrated in, FIGS. 3 through 8. In at least one example, the circuit 900, a power converter, and one or more other components are implemented together in a singular system, for example, by coupling the circuit 900, the power converter, and the one or more other components together in the system. In at least one example, the system is a SMPS.

In at least one example, the circuit 900 includes an error amplifier 905, a converter 910, a TDCM timer 915, a state machine 920, a driver 925, a TON timer 930, an double differentiator 935, a delay element 940, a clock generator 945, and a hysteresis timer 950. In some examples, the circuit 900 is further configured to couple to a filter 955 and/or a power converter 960. In at least one example, the power converter 960 is substantially similar to the power converter 100, discussed above with respect to FIG. 1. In at least one example, the error amplifier 905 has a first input configured to receive an output signal, or a feedback signal representative of the output signal (e.g., an attenuated version of the output signal), of the power converter 960, at a first input and a reference voltage Vref at a second input. Vref is, for example, a reference voltage to which the circuit 900 regulates (e.g., controls) the output of the power converter 960. An output of the error amplifier 905 is coupled to an input of the converter 910 and is configured to indicate a difference (or an amplification of a difference) between the values received at the first and second inputs of the error amplifier 905. In at least one example, the output of the error amplifier 905 is a stability compensated signal (e.g., compensated by the filter 955). An output of the converter 910 is coupled to a first input to the TDCM timer 915. In at least one example, the circuit 900 is configured to couple at the input of the converter 910 to the filter 955. The filter 955 is, for example, a stability compensation filter configured to filter the output of the error amplifier 905. The converter 910 is, for example, any circuit, component, and/or device suitable for converting an output of the error amplifier 905 from a voltage signal to a current signal. For example, the converter 910 may be a voltage-to-current converter.

The TDCM timer 915 is, in at least one example, any circuit, component, and/or device suitable for operation at least partially as a timer, for example, to count $TDCM_{(TIMER)}$ as illustrated and discussed above with respect to FIGS. 3 through 8. In at least one example, the TDCM timer 915 is an analog-based timer, as discussed above. The TDCM timer 915 is further coupled at an output to an input of the state machine 920 and a TDCM_end signal of the TDCM timer 915 indicates the end of $TDCM_{(TIMER)}$. In at least one example, an input of the double differentiator 935 is configured to couple to the power converter 960 and receive a signal representative of $V_{DRAIN}$ of a power transistor (not shown) of the power converter 960, as illustrated and discussed above with respect to FIGS. 3 through 8. An output of the double differentiator 935 is provided to the delay element 940. The delay element 940 is any suitable element for providing a fixed or adjustable amount of delay in a signal path of an output signal of the double differentiator 935. An output of the delay element 940 is, in at least some examples, coupled to an input of the state machine 920 and an output signal of the delay element 940 indicates the occurrence of a ZCD in $V_{DRAIN}$ of the power converter 960.

In at least some example, the state machine 920 further receives at various inputs an output of the TON timer 930 and multiple outputs of the hysteresis timer 950. Based on the received inputs, the state machine 920 generates a plurality of outputs including an en_TDCM output signal, an en_TON output signal, and an en_gate signal. In various examples, the en_TDCM timer enables and/or resets the TDCM timer 915 such that counting performed by the TDCM timer 915 is at least partially controlled by a value of the en_TDCM signal, the en_TON signal enables and/or resets the TON timer 930 such that counting performed by the TON timer 930 is at least partially controlled by a value of the en_TON signal, and the en_gate signal indicates that power transistor of the power converter should be turned on to begin the TON phase. In various other examples, the en_TDCM signal is provided to other components of the circuit 900 such as the clock generator 945 and/or the hysteresis timer 950.

In at least some examples, the state machine 920 includes multiple states and transitions from one of the multiple states to another of the multiple of states based on the TDCM_end signal, the TON_end signal, the ZCD signal, the hys_timer_low signal, and/or the hys_timer_high signal. At each of the multiple states, the state machine 920 outputs one or more of the en_TDCM signal, the en_TON signal, and/or the en_gate signal. For example, based on any one or more of a value of the TDCM_end signal received from the TDCM timer 915, a value of the TON_end signal received from the TON timer 930, a value of the ZCD signal received from the delay element 940, a value of the hys_timer_low signal received from the hysteresis timer 950, and/or a value of the hys_timer_high signal received from the hysteresis timer 950, the state machine 920 outputs one or more signals. The one or more signals output include any one or more of the en_TDCM signal, the en_TON signal, and/or the en_gate signal and are provided to any one or more of the TDCM timer 915, the TON timer 930, the driver 925, the clock generator 945, and/or the hysteresis timer 950. In at least one example, each unique combination of possible input signals received by the state machine 920 may correspond to a state of the state machine 920. Each state of the state machine 920 may further correspond to a unique combination of output signals provided by the state machine 920. For example, based on a result of one or more logical operations performed on the input signals received by the state machine 920, the state machine 920 generates the output signals. For example, for a first combination of input signals, the state machine 920 may exist and/or transition to a first state and output a first combination of output signals. Based on a change to one or more of the input signals of the first combination of input signals, the state machine 920 may transition to a second state and output a second combination of output signals. In various examples, the state machine 920 may receive any number of input signals, include any number of states, and output any number of output signals. In at least one example, the state machine 920 is implemented via, or comprises, a logic circuit or logic structure such as, or including any one or more of, one or more digital logic gates, one or more data storage elements (e.g., such as flip-flops or registers), a field programmable gate array (FPGA), an application specific integrated circuit (ASIC), and/or any other circuits, components, or combinations of circuits and/or components capable of generating at least one output signal based on a combination of input signals.

In at least one example, the TON timer 930 receives the en_TON signal from the state machine 920 at a first input and the output of the error amplifier 905 at a second input. The TON timer 930 is, in at least one example, any circuit, component, and/or device suitable for operation at least partially as a timer, for example, to count TON as illustrated and discussed above with respect to FIGS. 3 through 8. The TON timer 930 is further coupled at an output of the TON timer 930 to an input of the state machine 920 and the TON_end output signal of the TON timer 930 signals an end of the TON phase for the power converter 960. The TON timer 930 is, in at least one example, any circuit, component, and/or device suitable for operation at least partially as a timer, for example, to count TON as illustrated and discussed above with respect to FIGS. 3 through 8.

In at least one example, the clock generator 945 is coupled at an input to an output of the state machine 920 and is configured to receive the en_TDCM signal from the state machine 920. Based on a value of the en_TDCM signal, the clock generator 945 generates and outputs a clock (clk) signal. The clock generator 945 is, in at least one example, any circuit, component, and/or device suitable for operation at least partially as a timer, for example, to generate a clock signal according to a received input signal.

In at least one example, the hysteresis timer 950 is coupled at a first input to an output of the clock generator 945 to receive the clk signal from the clock generator 945 and is coupled at a second input to the state machine 920 to receive the en_TDCM signal from the state machine 920. Based on the clk signal and the en_TDCM signal, the hysteresis timer 950 is configured to generate the hys_timer_low and hys_timer_high signals and provide the hys_timer_low and hys_timer_high signals to the state machine 920. In at least some examples, the hys_timer_low signal corresponds to the $TDCM_{(LOW)}$ threshold discussed above with respect to FIGS. 5 through 8 and the hys_timer_high signal corresponds to the $TDCM_{(HIGH)}$ threshold also discussed above with respect to FIGS. 5 through 8. The hysteresis timer 950 is, in at least one example, any circuit, component, and/or device suitable for operation at least partially as a timer, for example, to generate the hys_timer_low and hys_timer_high signals according to the received clk and en_TDCM signals. In at least one example, the hysteresis timer 950 is digital-based counter, as discussed above.

Figure 10:
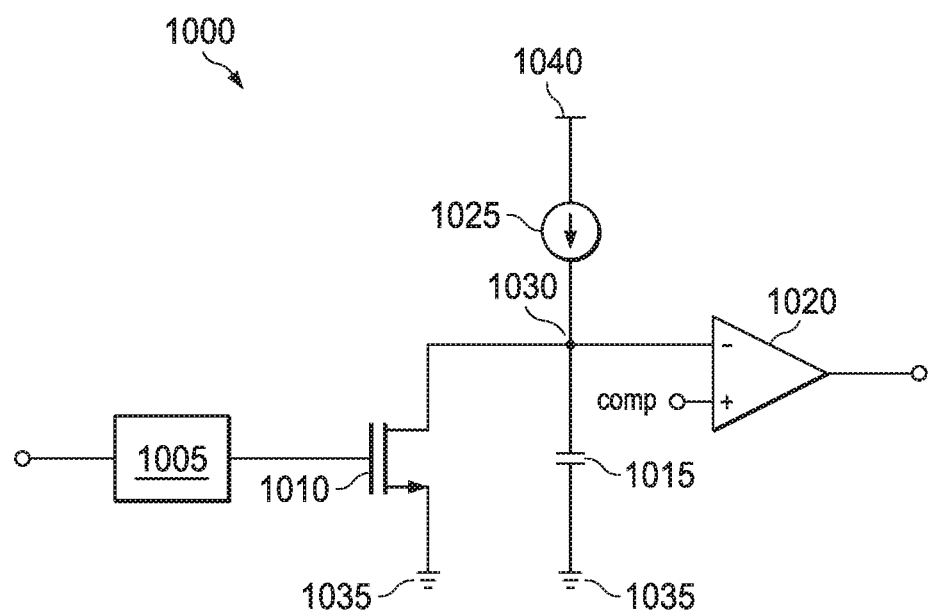
FIG. 10 is a schematic diagram of an illustrative timer in accordance with various examples.

Referring now to FIG. 10, a schematic diagram of an illustrative timer 1000 is shown. The timer 1000 is, in some examples, suitable to implement at least some aspects of the present disclosure, for example, to initiate and execute a timer that outputs a signal indicating an expiration of the timer. In at least one example, the timer 1000 is suitable for implementation as the TDCM timer 915 and/or the TON timer 930 of the circuit 900, discussed above with respect to FIG. 9. In various examples, the timer 1000 controls, initiates, and executes a timer such that an output of the timer 1000 indicates an expiration of the timer (e.g., indicating that the timer has reached a predetermined and or prescribed threshold or reference value).

In at least one example, the timer 1000 includes a buffer 1005, a switch 1010, a capacitor 1015, an amplifier 1020, and a current source 1025. In at least some examples, the timer 1000 does not include, but is instead configured to couple to, the capacitor 1015 and/or the current source 1025. The buffer 1005 is, in various examples, an inverter (e.g., a digital logic inverter), a unity-gain amplifier, or any other suitable buffering device. In some examples, the buffer 1005 may be omitted from the timer 1000. In various examples, the switch 1010 is a MOSFET, a BJT, or any other suitable form of controllable solid-state or mechanical switch. In at least one example, the switch 1010 is a NMOS. The switch 1010 is illustrated for the sake of discussion as an NMOS in FIG. 10, through the switch 1010 is not so limited herein and such illustration is merely for the sake of ease of description and understanding.

In at least one example, an input of the buffer 1005 is an enabling input of the timer 1000 and an output of the buffer 1005 is coupled to a control terminal of the switch 1010. For example, when the switch 1010 is a MOSFET, the output of the buffer 1005 is coupled to the gate terminal of the switch 1010. The switch 1010 is coupled between a node 1030 and a ground node 1035. For example, when the switch 1010 is a MOSFET, one of a drain terminal or a source terminal is coupled to one of the node 1030 or the ground node 1035 and the other of the drain terminal is coupled to the other of the node 1030 or the ground node 1035. The capacitor 1015 is coupled, or configured to couple, between the node 1030 and the ground node 1035. The current source 1025 is coupled, or configured to couple, between the node 1030 and a voltage supply 1040. The amplifier 1020 is coupled, or configured to coupled, at a first input to the node 1030 at is configured to receive a compensation (comp) or reference signal at a second input. In one example, the amplifier 1020 is implemented as an amplifier (e.g., an error amplifier, a high-gain amplifier, etc.). In another example, the amplifier 1020 is implemented as a comparator.

When the timer 1000 is implemented as the TDCM timer 915 of the circuit 900 in FIG. 9, the buffer 1005 is configured to receive the en_TDCM signal and the current source 1025 may, for example, be an output of the converter 910 such that the error amplifier 905 is the voltage supply 1040. The compensation signal may be, for example, a VREF_TDCM signal. An output of the amplifier 1020 may be, for example, the TDCM_end signal. In at least one example, VREF_TDCM is a predetermined value programmed into the timer 1000 at a time of manufacture of the timer 1000. For example, the value of VREF_TDCM is predetermined to satisfy the following equation 2:

$$TDCM_{(TIMER)} = \frac{C * \text{VREF\_TDCM}}{ICOMP}, \quad (2)$$

where C is a value of a capacitance (e.g., an internal capacitance) associated with the timer 1000 (including at least a value of the capacitor 1015) and ICOMP is a value of a signal provided by the current source 1025. In another example, VREF_TDCM is user-programmable or selectable after a time of manufacture.

When the timer 1000 is implemented as the TON timer 930 of the circuit 900 in FIG. 9, the buffer 1005 is configured to receive the en_TON signal and the current source 1025 may, for example, provide an IREF_TON current signal. The compensation signal may be the signal as present at the input of the converter 910. An output of the amplifier 1020 may be, for example, the TON_end signal. In at least one example, IREF_TON is a predetermined value programmed into the timer 1000 at a time of manufacture of the timer 1000. For example, the value of IREF_TON is predetermined to satisfy the following equation 3:

$$TON = \frac{C * COMP}{\text{IREF\_TON}}, \quad (3)$$

where C is the value of the capacitance associated with the timer 1000 (including at least the value of the capacitor 1015) and COMP is a value of the compensation signal received at the input of the converter 910. In another example, IREF_TON is user-programmable or selectable after a time of manufacture.

In operation, when the switch 1010 is open, current flows from the current source 1025 into the capacitor 1015 (e.g., such that energy is stored in the capacitor 1015). As current flows from the current source 1025 into the capacitor 1015, a voltage present at node 1030 increases. When the voltage present at node 1030 reaches a sufficiently high value with respect to the compensation signal received by the amplifier 1020, the output of the error amplifier transitions from a logical low state to a logical high state indicating the expiration of the timer 1000 (e.g., the timer reaching a specified amount of time). When the switch 1010 is closed, energy stored in the capacitor 1015 is discharged through the switch 1010 to the ground node 1035. In at least one example, closing switch 1010 resets, clears, and/or disables the timer 1000.

Figure 11:
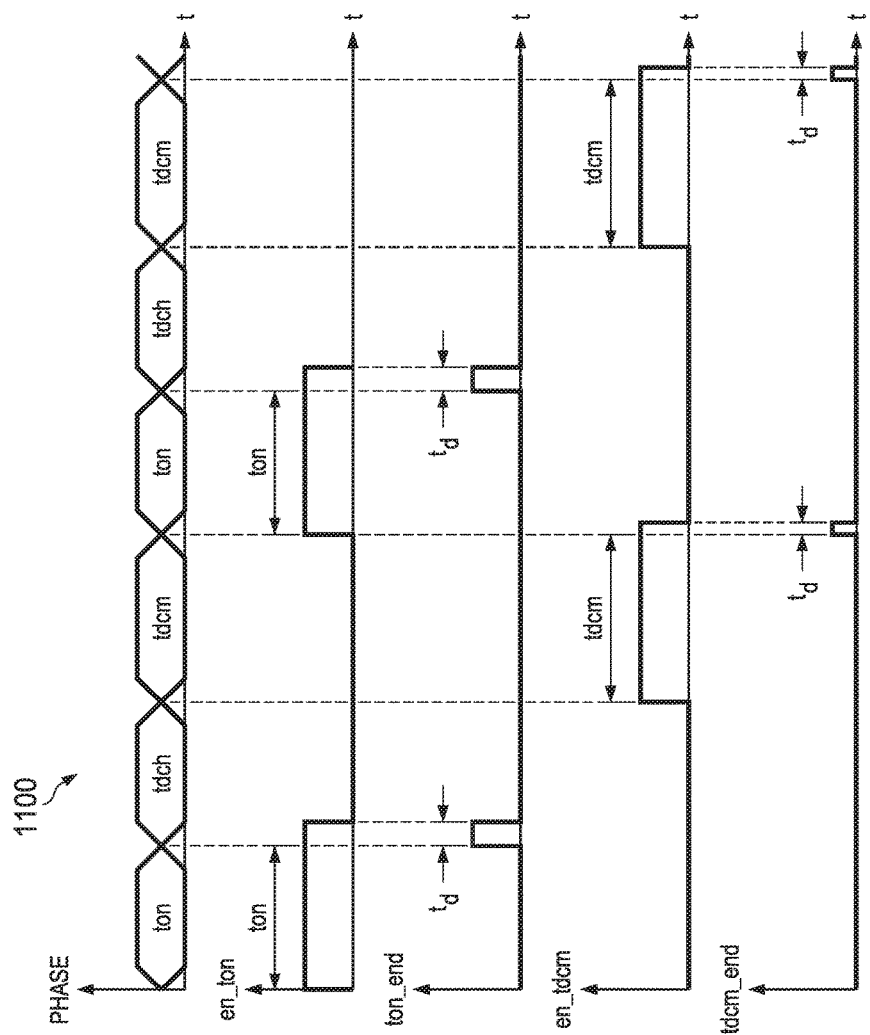
FIG. 11 is a diagram of various signal waveforms of a timer in accordance with various examples.

FIG. 11 is a diagram 1100 of various signal waveforms of the timer 1000. In at least one example, the diagram 1100 includes waveforms corresponding to a phase of a power converter coupled to, and under the control of, a circuit including the timer 1000, en_TON, TON_end, en_TDCM, and TDCM_end on vertical axes and time on horizontal axes. As shown in FIG. 11, while en_TON is a logical high signal and until TON_end transitions to a logical high signal from a logical low signal, the power converter is controlled to operate in the TON phase. When the TON_end signal transitions to a logical high signal, the power converter is controlled to operate in the TDCH phase. The TON_end signal, in at least one example, extends for a period of time $t_d$ defined as the non-ideal delay of the timer 1000 to satisfy specified setup and/or hold times for the timer 1000 and/or other components of the circuit 900 and/or the power converter. Similarly, when en_TDCM transitions to a logical high signal from a logical low signal, the power converter is controlled to operate in the TDCM phase until the TDCM_end signal transitions to a logical high signal from a logical low signal. The TDCM_end signal, in at least one example, extends for the period of time $t_d$.

Figure 12:
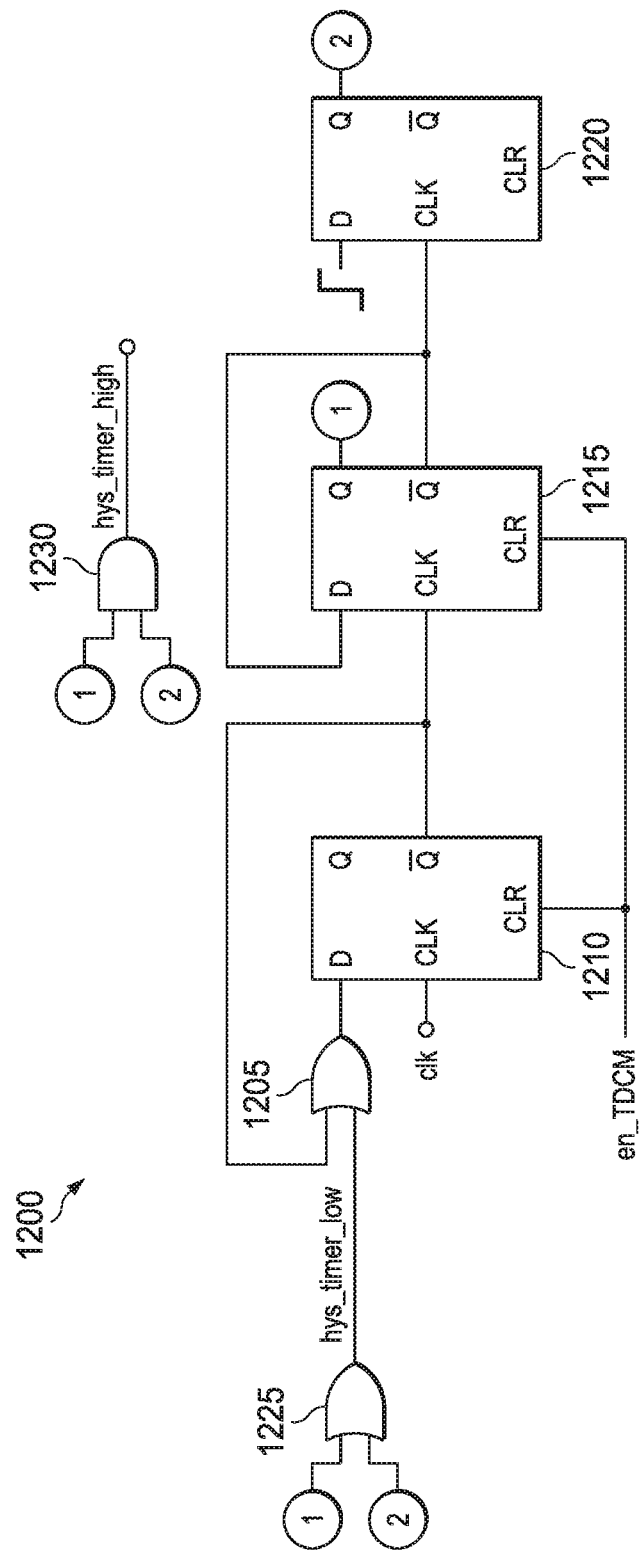
FIG. 12 is a schematic diagram of an illustrative hysteresis timer in accordance with various examples.

Referring now to FIG. 12, a schematic diagram of an illustrative hysteresis timer 1200 is shown. The hysteresis timer 1200 is, in some examples, suitable to implement at least some aspects of the present disclosure, for example, to output one or more signals indicating that a threshold period of time has elapsed. In at least one example, the hysteresis timer 1200 is suitable for implementation as the hysteresis timer 950 of the circuit 900, discussed above with respect to FIG. 9.

In at least one example, the hysteresis timer 1200 includes an OR digital logic gate 1205, a flip-flop 1210, a flip-flop 1215, a flip-flop 1220, an OR digital logic gate 1225, and an AND digital logic gate 1230. In at least one example, the OR digital logic gate 1205, has an output coupled to a data input of the flip-flop 1210, a first input of the OR digital logic gate 1205 is coupled to an inverted output of the flip-flop 1210, and a second input of the OR digital logic gate 1205 is coupled to an output of the OR digital logic gate 1225. A clock input of the flip-flop 1210 is configured to receive a clk signal and a clear or reset input of the flip-flop 1210 is configured to receive an en_TDCM signal. The inverted output of the flip-flop 1210 is further coupled to a clock input of the flip-flop 1215, a clear or reset input of the flip-flop 1215 is configured to receive the en_TDCM signal, and a data input of the flip-flop 1215 is coupled to an inverted output of the flip-flop 1215. The inverted input of the flip-flop 1215 is further coupled to a clock input of the flip-flop 1220 and a data input of the flip-flop 1220 is configured to receive a logical high signal. The OR digital logic gate 1225 is coupled at a first input to a non-inverted output of the flip-flop 1215 and at a second input to a non-inverted output of the flip-flop 1220. An output of the OR digital logic gate 1225 provides the hys_timer_low signal indicating that the Timer$_{(LOW)}$ threshold has been passed. The AND digital logic gate 1230 is coupled at a first input to a non-inverted output of the flip-flop 1215 and at a second input to a non-inverted output of the flip-flop 1220. An output of the AND digital logic gate 1230 provides the hys_timer_high signal indicating that the Timer$_{(HIGH)}$ threshold has been passed.

Figure 13:
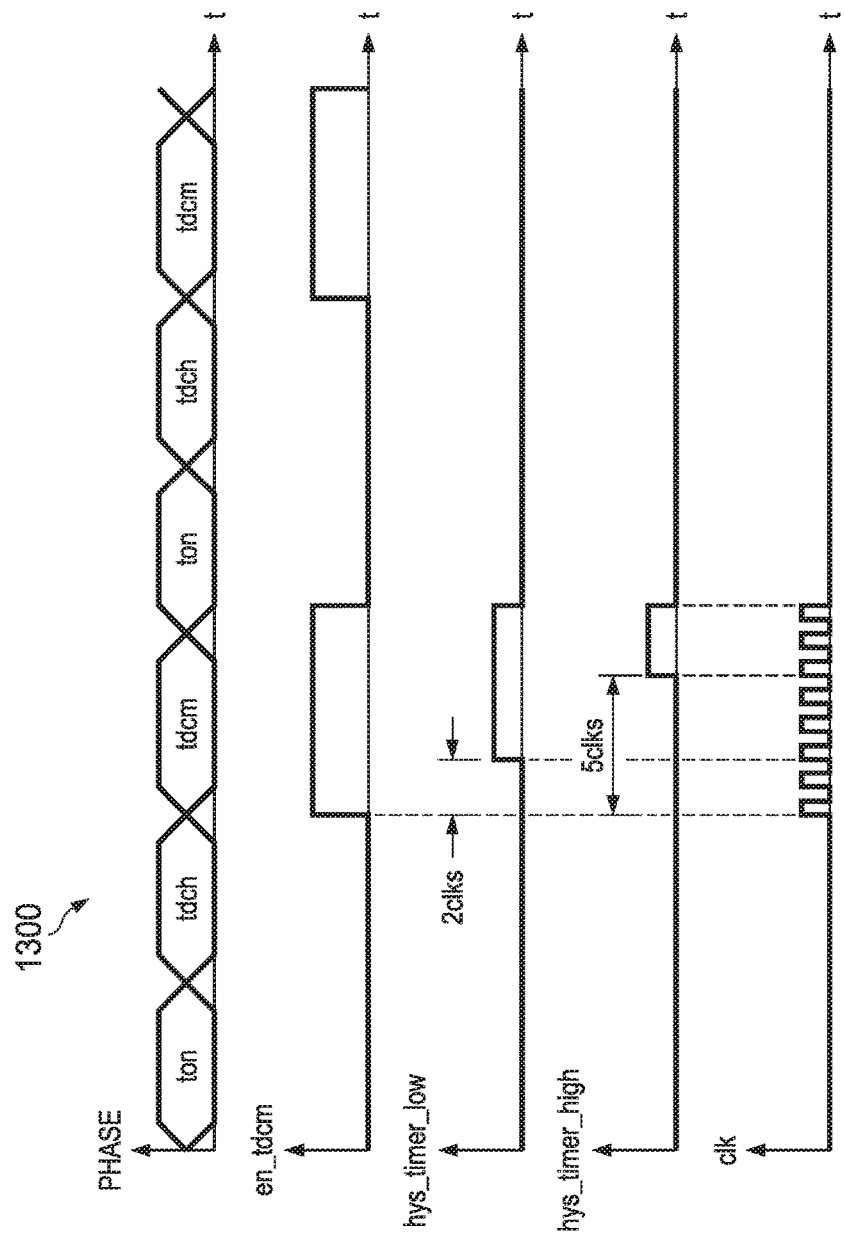
FIG. 13 is a diagram of various signal waveforms of a hysteresis timer in accordance with various examples.

FIG. 13 is a diagram 1300 of various signal waveforms of the hysteresis timer 1200. In at least one example, the diagram 1300 includes waveforms corresponding to a phase of a power converter coupled to, and under the control of, a circuit including the timer 1200, en_TDCM, hys_timer_low, hys_timer_high, and clk on vertical axes and time on horizontal axes. As shown in FIG. 13, while en_TDCM is a logical high signal, the hysteresis timer 1200 operates and begins counting. The number of flip-flops in the hysteresis timer 1200 and/or a selection of the particular digital logic gates utilized in the hysteresis timer 1200, in at least one example, determines a length of hys_timer_low and/or hys_timer_high. For example, while hys_timer_low is illustrated as transitioning from a logical low signal to a logical high signal after two clock cycles and hys_timer_high is illustrated as transitioning from a logical low signal to a logical high signal after five clock cycles, in various other examples by increasing or decreasing a number of flip-flops in the hysteresis timer 1200 and/or selecting additional or alternative digital logic gates, one or both of the number of clock cycles for defining hys_timer_low and/or hys_timer_high may be altered.

Figure 14:
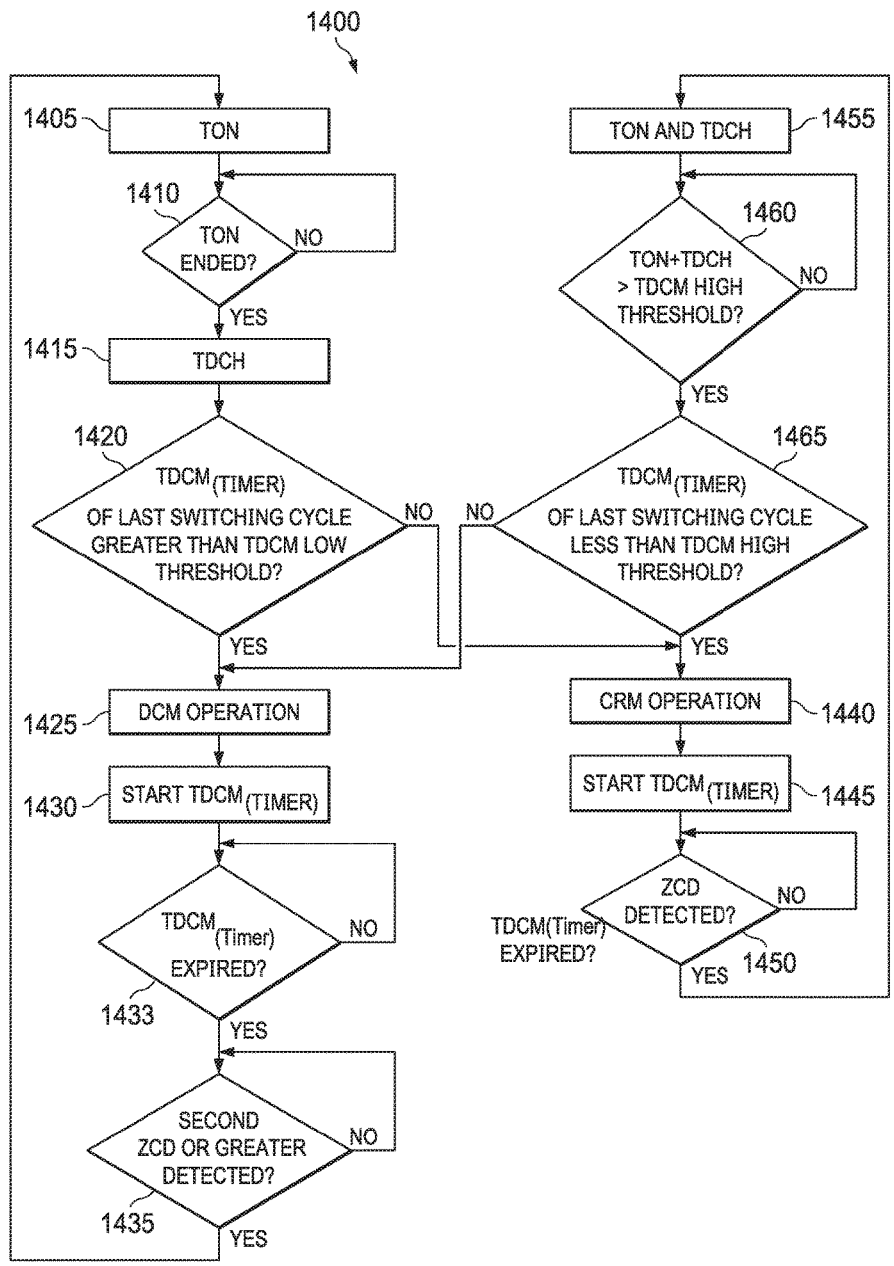
FIG. 14 is a flowchart of an illustrative control method in accordance with various examples.

Referring now to FIG. 14, a flowchart of an illustrative control method 1400 is shown. In at least one example, the method 1400 is a control method for controlling a power converter capable of both DCM operation and CRM operation. In at least one example, at least some aspects of the method 1400 are performed by a circuit such as the circuit 900, discussed above with respect to FIG. 9. In at least one example, the circuit implementing the method 1400 is a power converter controller coupled, or configured to couple to, a power converter.

At operation 1405, the circuit controls the power converter to operate in a TON phase. The power converter is controlled to operate in the TON phase, for example, by the circuit controlling a power transistor of the power converter to conduct between multiple terminals of the power transistor to cause energy to flow through at least a portion of the power converter.

At operation 1410, a determination is made of whether the TON phase has ended. The determination is made, for example, by logic of the circuit (e.g., a TON timer) determining whether a TON time has elapsed. An output of the TON timer indicating that the TON time has lapsed is, for example, based at least partially on an output of the power converter and a desired or reference voltage to which the circuit regulates the output of the power converter. When the TON phase has not ended, the method 1400 returns to operation 1405. When the TON phase has ended, the circuit controls the power transistor of the power converter to stop conducting and the method 1400 proceeds to operation 1415.

At operation 1415, the power converter operates in the TDCH phase until the first ZCD of $V_{DRAIN}$ of the power transistor. At operation 1420, a determination is made of whether the elapsed TDCM$_{(TIMER)}$ of a preceding (e.g., immediately preceding) switching cycle is greater than the TDCM$_{(LOW)}$ threshold. When the TDCM$_{(TIMER)}$ of the preceding switching cycle is greater than the TDCM$_{(LOW)}$ threshold, the method 1400 proceeds to operation 1425.

At operation 1425, the circuit controls the power converter to continue operating according to DCM operation and the method 1400 proceeds to operation 1430. At operation 1430, the circuit resets and/or begins the TDCM$_{(TIMER)}$.

At operation 1433, the circuit determines whether the TDCM$_{(TIMER)}$ has expired. The circuit determines whether the TDCM$_{(TIMER)}$ has expired, in at least one example, by comparing the TDCM$_{(TIMER)}$ to a reference or threshold value. The threshold value, in at least one example, has a value sufficient to cause the threshold value to function as a logical high signal. When the TDCM$_{(TIMER)}$ has not expired, the method 1400 remains at operation 1433. When the TDCM$_{(TIMER)}$ has expired, the method 1400 proceeds to operations 1435 At operation 1435, the circuit determines whether at least a second ZCD of V$_{DRAIN}$ of the power transistor has been reached. The circuit determines whether at least the second ZCD of V$_{DRAIN}$ of the power transistor has been reached, in at least one example, by double differentiating a value of V$_{DRAIN}$ to identify each ZCD occurring in the power converter. When at least the second ZCD of VDRAIN has not been reached, the method 1400 remains at operation 1435. When at least the second ZCD of V$_{DRAIN}$ has been reached, the method 1400 returns to operation 1405.

Returning now to operation 1420, when the TDCM$_{(TIMER)}$ of the preceding switching cycle is not greater than the TDCM$_{(LOW)}$ threshold, the method 1400 proceeds to operation 1440. At operation 1440, the circuit controls the power converter to transition from operating according to DCM operation to operating according to CRM operation and the method 1400 proceeds to operation 1445. At operation 1445, the circuit resets and/or begins the TDCM$_{(TIMER)}$. At operation 1450, the circuit determines whether a ZCD of V$_{DRAIN}$ of the power transistor has been reached. The circuit determines whether the ZCD of V$_{DRAIN}$ of the power transistor has been reached, in at least one example, by double differentiating a value of V$_{DRAIN}$ to identify each ZCD occurring in the power converter. When the ZCD of V$_{DRAIN}$ has not been reached, the method 1400 remains at operation 1450. When the ZCD of V$_{DRAIN}$ has been reached, the method 1400 proceeds to operation 1455.

At operation 1455, the circuit controls the power converter to operate in the TON phase. The power converter is controlled to operate in the TON phase, for example, by the circuit controlling a power transistor of the power converter to conduct between multiple terminals of the power transistor to cause energy to flow through at least a portion of the power converter.

At operation 1457, a determination is made of whether the TON phase has ended. The determination is made, for example, by logic of the circuit (e.g., a TON timer) determining whether a TON time has elapsed. An output of the TON timer indicating that the TON time has lapsed is, for example, based at least partially on an output of the power converter and a desired or reference voltage to which the circuit regulates the output of the power converter. When the TON phase has not ended, the method 1400 remains at operation 1457. When the TON phase has ended, the circuit controls the power transistor of the power converter to stop conducting and the method 1400 proceeds to operation 1458.

At operation 1458, the power converter operates in the TDCH phase until the first ZCD of V$_{DRAIN}$ of the power transistor. At operation 1460, the circuit compares a length of time of operation in the TON phase plus the TDCH phase to determine whether the length of time exceeds the TDCM$_{(HIGH)}$ threshold. When the length of time of operation in the TON phase plus the TDCH phase has not exceeded the TDCM$_{(HIGH)}$ threshold, the method 1400 remains at operation 1460. When the length of time of operation in the TON phase plus the TDCH phase has exceeded the TDCM$_{(HIGH)}$ threshold, the method 1400 proceeds to operation 1465.

At operation 1465, a determination is made of whether the elapsed TDCM$_{(TIMER)}$ of a preceding (e.g., immediately preceding) switching cycle is greater than the TDCM$_{(HIGH)}$ threshold. When the TDCM$_{(TIMER)}$ of the preceding switching cycle is greater than the TDCM$_{(HIGH)}$ threshold, the method 1400 proceeds to operation 1440. When the TDCM$_{(TIMER)}$ of the preceding switching cycle is not greater than the TDCM$_{(HIGH)}$ threshold, the method 1400 returns to operation 1425.

In at least one example, the method 1400 implements DCM hysteresis using an analog timer to generate TDCM$_{(TIMER)}$ and digital circuits to measure TDCM$_{(LOW)}$ or TDCM$_{(HIGH)}$ thresholds and determine the operating mode (CRM or DCM) for controlling the power converter. In at least one example, the TDCM$_{(TIMER)}$ is measured on the fly (e.g., in real-time) rather than being calculated/predicted ahead of time. In at least one example, the operating mode (CRM or DCM) for a current switching cycle is decided based on the TDCM$_{(TIMER)}$ measurement and mode of operation of the last switching cycle. In at least some examples, the TDCM$_{(TIMER)}$ may be a function of a low bandwidth path and the hysteresis functionality of the present disclosure results in mode of operation changes that occur infrequently when the TDCM hysteresis (length of time in one switching cycle between TDCM$_{(LOW)}$ and TDCM$_{(HIGH)}$ thresholds) is adequately sized.

In at least one example, the DCM time for CRM operation is clamped to 0 seconds (or a small valley delay to achieve valley switching). In at least one example, to accommodate clamping the DCM during CRM operation to 0 seconds, the TDCM$_{(TIMER)}$ operates in parallel with the TON and TDCH phases until the TDCM$_{(TIMER)}$ or the TDCM$_{(TIMER)}$ reaches the TDCM$_{(HIGH)}$ threshold such that TON+TDCH may be greater than TDCM$_{(HIGH)}$ while in CRM operation mode. In at least one example, the first valley may be skipped in DCM mode instead of clamping the minimum TDCM$_{(TIMER)}$ to a constant. This may at least partially mitigate and/or prevent distortion when the first valley duration changes across the line due to body diode conduction (e.g., of the power transistor).

While the operations of the method 1400 have been discussed and labeled with numerical reference, each of the operations of the method 1400 may include additional operations that are not recited herein, any one or more of the operations recited herein may include one or more sub-operations, any one or more of the operations recited herein may be omitted, and/or any one or more of the operations recited herein may be performed in an order other than that presented herein (e.g., in a reverse order, substantially simultaneously, overlapping, etc.), all of which is intended to fall within the scope of the present disclosure.

Figure 15:
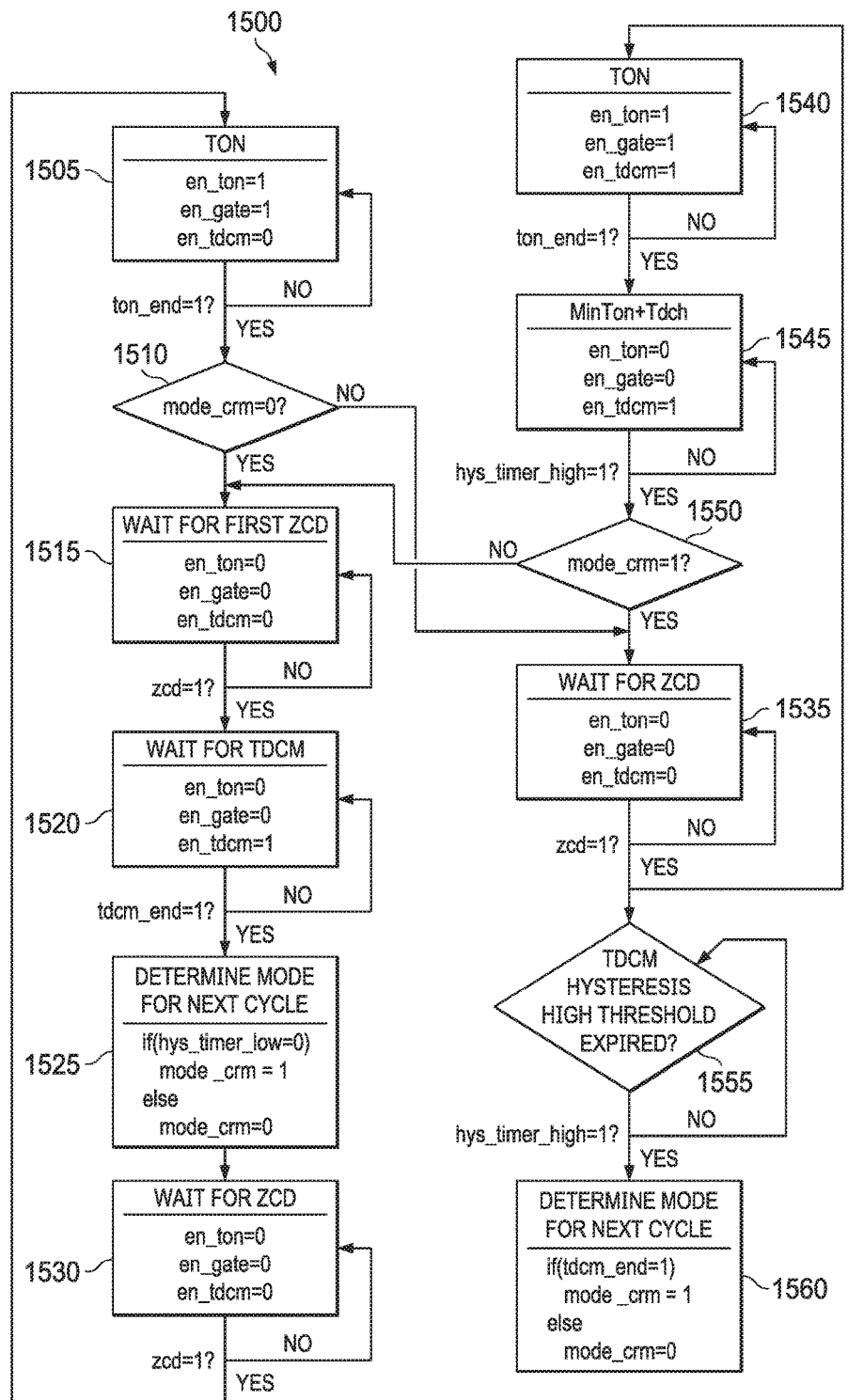
FIG. 15 is an illustrative state diagram in accordance with various examples.

Referring now to FIG. 15, an illustrative state diagram 1500 is shown. In at least one example, the state diagram 1500 corresponds to operations of the state machine 920 of the circuit 900, discussed above. In at least one example, the state diagram 1500 further corresponds to the state machine 920 executing a method, such as the method 1400 of FIG. 14, discussed above.

In at least one example, the state machine 920 begins operation at state 1505. At state 1505, the state machine 920 initiates TON by outputting en_TON and en_gate as logical high signals and en_TDCM as a logical low signal. The state machine 920 remains in the state 1505 until the state machine 920 receives an input signal of TON_end as a logical high signal, at which time the state machine 920 transitions to state 1510.

At state 1510, the state machine 920 determines whether mode_CRM has a value of zero (e.g., a binary value of zero or a logical low value). In at least some examples, mode_CRM is a value internally generated and/or stored by the state machine 920, as will be further discussed below. When mode_CRM has a value of zero, the state machine 920 transitions to state 1515.

At state 1515, the state machine 920 outputs en_TON, en_gate, and en_TDCM as logical low signals and remains in state 1515 until the state machine 920 receives an indication of a first ZCD in a power converter (e.g., the power converter 960 of FIG. 9, under control of the circuit 900). Upon receipt of the indication of the first ZCD in the power converter, the state machine 920 transitions to state 1520.

At state 1520, the state machine 920 outputs en_TON and en_gate as logical low signals and en_TDCM as a logical high signal. The state machine 920 subsequently remains at state 1520 until the state machine 920 receives an input signal of TDCM_end as a logical high signal, at which time the state machine 920 transitions to state 1525.

At state 1525, the state machine 920 determines a mode of operation for a next control cycle for controlling the power converter. The state machine 920 determines the mode of operation for the next control cycle, for example, according to a received hys_timer_low signal. When the received hys_timer_low signal has a logical low value, the state machine 920 sets mode_CRM to a value of one. When the received hys_timer_low signal does not have a logical low value, the state machine 920 sets mode_CRM to a value of zero. After setting the value of mode_CRM, the state machine 920 transitions to state 1530.

At state 1530, the state machine 920 outputs en_TON, en_gate, and en_TDCM as logical low signals and remains in state 1530 until the state machine 920 receives an indication of another ZCD in the power converter. Upon receipt of the indication of another ZCD in the power converter, the state machine 920 transitions to state 1505.

Returning now to state 1510, when mode_CRM has a value of one, the state machine 920 transitions to state 1535. At state 1535, the state machine 920 outputs en_TON, en_gate, and en_TDCM as logical low signals and remains in state 1535 until the state machine 920 receives an indication of a ZCD in the power converter. Upon receipt of the indication of the ZCD in the power converter, the state machine 920 transitions to both states 1540 and 1555 in parallel.

At state 1540, the state machine 920 outputs en_TON, en_gate, and en_TDCM as logical high signals and remains in state 1530. The state machine 920 remains in the state 1540 until the state machine 920 receives an input signal of TON_end as a logical high signal, at which time the state machine 920 transitions to state 1545.

At state 1545, the state machine 920 outputs en_TON and en_gate as logical low signals and en_TDCM as a logical high signal. The state machine 920 remains in the state 1545 until the state machine 920 receives an input signal of hys_timer_high as a logical high signal, at which time the state machine 920 transitions to state 1550.

At state 1550, the state machine 920 determines whether mode_CRM has a value of one (e.g., a binary value of one or a logical high value). When mode_CRM has a value of zero, the state machine 920 transitions to state 1515. When mode_CRM has a value of one, the state machine 920 transitions to state 1535.

Returning to state 1555, the state machine 920 monitors a value of the hys_timer_high input. When the hys_timer_high input has a logical high value, the state machine 920 transitions to state 1560. At state 1560, the state machine 920 determines a mode of operation for a next control cycle for controlling the power converter. The state machine 920 determines the mode of operation for the next control cycle, for example, according to a received TDCM_end signal. When the TDCM_end signal has a logical high value, the state machine 920 sets mode_CRM to a value of one. When the received TDCM_end signal does not have a logical low value, the state machine 920 sets mode_CRM to a value of zero.

In the foregoing discussion, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or IC package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., MOSFET, NMOS, PMOS, etc.), these components may be exchanged for components of other process technologies (e.g., replace MOSFET with BJT, replace NMOS with PMOS or vice versa, etc.) and reconfiguring circuits including the replaced components to provide desired functionality at least partially similar to functionality available prior to the component replacement. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A circuit, comprising:
a logic circuit having multiple inputs and multiple outputs;
a calculated discontinuous conduction (DCM) time (TDCM) timer having an input coupled to one of the logic circuit outputs and an output coupled to one of the logic circuit inputs;
an on-time (TON) timer having an input coupled to one of the logic circuit outputs and an output coupled to one of the logic circuit inputs; and
a hysteresis timer having an input coupled to one of the logic circuit outputs and multiple outputs coupled to multiple of the logic circuit inputs.

2. The circuit of claim 1, further comprising a driver coupled between one of the logic circuit outputs and a gate terminal of a power transistor of a power converter.

3. The circuit of claim 1, further comprising a clock generator coupled between one of the logic circuit outputs and a second input of the hysteresis timer.

4. The circuit of claim 1, further comprising a double differentiator coupled between a drain terminal of a power transistor of a power converter and one of the logic circuit inputs.

5. The circuit of claim 1, further comprising an error amplifier coupled between an output of a power converter and another input of the TDCM timer.

6. The circuit of claim 5, further comprising a filter coupled to an output of the error amplifier.

7. A system, comprising:
a power converter comprising at least one power transistor; and
a power converter controller, comprising:
a logic circuit having:
first, second, third, fourth, and fifth logic circuit inputs; and
first, second, and third logic circuit outputs;
a discontinuous conduction (DCM) (TDCM) timer having:
a first TDCM timer input and a second TDCM timer input, the second TDCM timer input coupled to the first logic circuit output; and
a TDCM timer output coupled to the first logic circuit input;
an on-time (TON) timer having:
a first TON timer input and a second TON timer input, the first TON timer input coupled to the second logic circuit output; and
a TON timer output coupled to the second logic circuit input;
a double differentiator having a double differentiator input and a double differentiator output;
a delay element having:
a delay element input coupled to the double differentiator output; and
a delay element output coupled to the third logic circuit input;
a clock generator having:
a clock generator input coupled to the first output of the logic circuit; and
a clock generator output; and
a hysteresis timer having:
a first hysteresis timer input coupled to the clock generator output;
a second hysteresis timer input coupled to the second output of the logic circuit;
a first hysteresis timer output coupled to the fourth logic circuit input; and
a second hysteresis timer output coupled to the fifth logic circuit input.

8. The system of claim 7, further comprising an error amplifier having:
a first error amplifier input configured to receive a feedback signal representative of an output of the power converter;
a second error amplifier input configured to receive a reference signal representative of a prescribed value for regulation of the output of the power converter; and
an error amplifier output coupled to a first node; and
a voltage-to-current converter coupled between the first node and the first TDCM timer input.

9. The system of claim 7, wherein the TDCM timer comprises:
an inverter having an input coupled to the first logic circuit output and an output;
a first transistor having a gate terminal coupled to the output of the inverter, a source terminal coupled to a ground node, and a drain terminal coupled to first node;
a capacitor configured to couple between the first node and the ground node; and
an error amplifier having a first input coupled to the first TDCM timer input, a second input configured to receive a reference input, and an output coupled to the first logic circuit input.

10. The system of claim 7, wherein the TON timer comprises:
an inverter having an input coupled to the second logic circuit output and an output;
a first transistor having a gate terminal coupled to the output of the inverter, a source terminal coupled to a ground node, and a drain terminal coupled to first node;
a capacitor configured to couple between the first node and the ground node;
a current source configured to couple between a voltage source and the first node; and
an error amplifier having a first input coupled to the first node, a second input configured to receive a compensation input, and an output coupled to the second logic circuit input.

11. The system of claim 7, wherein the hysteresis timer comprises:
a first OR gate;
a first flip-flop having:
a data input coupled to an output of the first OR gate;
a clock input coupled to the clock generator output;
a clear input coupled to the first logic circuit output; and
an inverted output coupled to a first input of the first OR gate;
a second flip-flop having:
a data input;
a clock input coupled to the inverted output of the first flip-flop;
a clear input coupled to the first logic circuit output;
a non-inverted output; and
an inverted output coupled to the data input of the second flip-flop;

a third flip-flop having:
  a data input configured to receive a logical high signal;
  a clock input coupled to the inverted output of the second flip-flop;
  a non-inverted output;
  a second OR gate having:
    a first input coupled to the non-inverted output of the second flip-flop;
    a second input coupled to the non-inverted input of the third flip-flop; and
    an output coupled to the second input of the first OR gate and the fourth logic circuit input; and
  an AND gate having:
    a first input coupled to the non-inverted output of the second flip-flop;
    a second input coupled to the non-inverted input of the third flip-flop; and
    an output coupled to the fifth logic circuit input.

12. The system of claim 7, further comprising a driver having a driver input coupled to the third logic circuit output and a driver output configured to couple to a gate terminal of the power transistor.

13. The system of claim 7, wherein the double differentiator is configured to receive a signal at the double differentiator input representative of a drain voltage of the power transistor.

14. The system of claim 7, wherein the circuit is further configured to couple to a stability compensation filter.

15. A method, comprising:
  controlling a power converter to operate in an on-time (TON) phase of a discontinuous conduction (DCM) operation mode;
  controlling the power converter to continue operating in the DCM operation mode when a calculated DCM time (TDCM) timer of a preceding switching cycle of the power converter is greater than a first threshold;
  beginning a first new TDCM timer when operating in the DCM operation mode;
  determining whether at least a second zero crossing detection (ZCD) of a drain voltage ($V_{DRAIN}$) of the power converter has occurred in the DCM operation mode;
  returning to controlling the power converter to operate in the TON phase of the DCM operation mode when at least the second ZCD has occurred in the DCM operation mode;
  controlling the power converter to begin operating in a critical conduction (CRM) operation mode when the first new TDCM timer of the preceding switching cycle of the power converter is less than the first threshold;
  beginning a second new TDCM timer when operating in the CRM operation mode;
  determining whether a first ZCD of the power converter has occurred in the CRM operation mode;
  controlling the power converter to operate in the TON phase of the CRM operation mode when the first ZCD has occurred in the CRM operation mode;
  controlling the power converter to continue operating in the CRM operation mode a length of time of the TON phase of the CRM operation mode and a TDCH phase is greater than a second threshold and a TDCM timer of a second preceding switching cycle of the power converter is less than the second threshold; and
  controlling the power converter to return to operating in the DCM operation mode when the second new TDCM timer is greater than the second threshold.

16. The method of claim 15, wherein the method is a DCM hysteresis method.

17. The method of claim 15, wherein the first new TDCM timer and the second new TDCM timer are determined according to an analog timer, and wherein the first threshold and the second threshold are determined according to digital counters.

18. The method of claim 15, wherein each of the first TDCM timer and the second TDCM timer are calculated in real-time and the TDCM timer of the preceding switching cycle and the TDCM timer of the another preceding switching cycle are measure in real-time.

19. The method of claim 15, wherein a mode of operation of an subsequent switching cycle of the power converter is chosen based on a TDCM timer value of an preceding switching cycle of the power converter.

20. The method of claim 15, wherein controlling the power converter comprises controlling a value of a signal provided to a gate terminal of a power transistor of the power converter.

* * * * *